US011315071B1

(12) United States Patent
Bentley et al.

(10) Patent No.: US 11,315,071 B1
(45) Date of Patent: Apr. 26, 2022

(54) SPEECH-BASED STORAGE TRACKING

(71) Applicant: Amazon Technologies, Inc., Seattle, WA (US)

(72) Inventors: Peter Van Tuyl Bentley, Seattle, WA (US); Jonathan Allen Smuda, Bothell, WA (US)

(73) Assignee: Amazon Technologies, Inc., Seattle, WA (US)

( * ) Notice: Subject to any disclaimer, the term of this patent is extended or adjusted under 35 U.S.C. 154(b) by 339 days.

(21) Appl. No.: 15/192,860

(22) Filed: Jun. 24, 2016

(51) Int. Cl.
*G06Q 10/08* (2012.01)
*G10L 13/08* (2013.01)

(52) U.S. Cl.
CPC ............ *G06Q 10/087* (2013.01); *G10L 13/08* (2013.01)

(58) Field of Classification Search
CPC .............................. G06Q 10/087; G10L 13/08
USPC .......................................................... 705/28
See application file for complete search history.

(56) References Cited

U.S. PATENT DOCUMENTS

| | | | | |
|---|---|---|---|---|
| 6,204,763 B1 * | 3/2001 | Sone | .................... | A47G 29/141 221/2 |
| 6,658,389 B1 * | 12/2003 | Alpdemir | ............... | G06Q 30/02 704/270 |
| 6,728,676 B1 * | 4/2004 | Ortega | ................. | G06Q 20/203 704/231 |
| 6,813,341 B1 * | 11/2004 | Mahoney | ............. | G06Q 10/087 340/572.1 |
| 8,823,523 B2 * | 9/2014 | Lee | .......................... | F25D 29/00 340/572.1 |
| 9,060,224 B1 * | 6/2015 | List | .......................... | G10L 15/08 |
| 9,100,799 B1 | 8/2015 | Thiagarajan et al. | | |
| 9,109,943 B2 * | 8/2015 | Mager | ................ | G01G 23/3735 |
| 9,123,339 B1 * | 9/2015 | Shaw | ....................... | G10L 15/22 |
| 9,147,212 B2 * | 9/2015 | Pettyjohn | ........... | G06Q 30/0603 |

(Continued)

OTHER PUBLICATIONS

The Examiner's attention is hereby drawn to the specification and file history of co-pending U.S. Appl. No. 15/192,833, entitled "Speech-Based Inventory Management System and Method", filed Jun. 24, 2016, which may contain information relevant to the present application.

(Continued)

*Primary Examiner* — Allen C Chein
*Assistant Examiner* — Denisse Y Ortiz Roman
(74) *Attorney, Agent, or Firm* — Pierce Atwood LLP

(57) ABSTRACT

Systems and methods for tracking inventory are provided herein. In some embodiments, a method for tracking inventory includes receiving weight sensor data representing a weight of a physical item in the storage unit, adding the weight of the physical item to a profile corresponding to the physical item, determining that the weight of the physical item is less than a predetermined threshold weight associated with the physical item, generating notification information associated with the physical item, and sending the notification information. In some embodiments, a method for tracking inventory includes receiving sensor data representing a location of a physical item, adding the location of the physical item to a profile corresponding to the physical item, receiving audio data representing a request for the location of the physical item, retrieving the location of the physical item from the profile, generating responsive data representing the of the physical item, and sending the responsive data.

16 Claims, 16 Drawing Sheets

(56) References Cited

U.S. PATENT DOCUMENTS

| | | | |
|---|---|---|---|
| 9,215,269 B2 | 12/2015 | Freeman, II et al. | |
| 9,268,260 B2 | 2/2016 | Eto | |
| 9,626,703 B2* | 4/2017 | Kennewick, Sr. | ............................ G06Q 30/0601 |
| 9,719,720 B2* | 8/2017 | Seo | ............ F25D 29/00 |
| 9,922,530 B2* | 3/2018 | Wu | ............ G08B 21/24 |
| 9,930,444 B1* | 3/2018 | Stanley | ............ H04R 1/025 |
| 9,953,278 B2* | 4/2018 | Glassman | ............ G06Q 10/06 |
| 9,990,176 B1* | 6/2018 | Gray | ............ G06F 3/167 |
| 10,027,866 B2* | 7/2018 | Carlotto | ............ G06F 17/3028 |
| 2004/0093216 A1* | 5/2004 | Ashish | ............ G10L 15/30 704/270.1 |
| 2004/0210442 A1* | 10/2004 | Glynn | ............ G06Q 10/06 704/275 |
| 2004/0228456 A1* | 11/2004 | Glynn | ............ G06Q 10/06 379/88.01 |
| 2007/0017998 A1* | 1/2007 | Sears | ............ G06Q 10/087 235/462.45 |
| 2007/0122035 A1* | 5/2007 | Lai | ............ G01G 23/3707 382/181 |
| 2008/0052201 A1 | 2/2008 | Bodin et al. | |
| 2008/0319752 A1* | 12/2008 | Kuo | ............ G10L 13/047 704/258 |
| 2009/0157392 A1* | 6/2009 | Alewine | ............ G10L 15/183 704/201 |
| 2010/0102930 A1* | 4/2010 | McCoy | ............ G06F 19/3462 340/5.92 |
| 2010/0106624 A1* | 4/2010 | Ashrafzadeh | ............ G06Q 10/08 705/28 |
| 2011/0153614 A1 | 6/2011 | Solomon | |
| 2012/0232897 A1* | 9/2012 | Pettyjohn | ............ G10L 13/08 704/235 |
| 2013/0077534 A1* | 3/2013 | Hu | ............ H04L 41/5054 370/259 |
| 2013/0223673 A1 | 8/2013 | Davis et al. | |
| 2013/0290106 A1 | 10/2013 | Bradley et al. | |
| 2014/0052555 A1 | 2/2014 | MacIntosh | |
| 2014/0074762 A1 | 3/2014 | Campbell | |
| 2014/0172953 A1* | 6/2014 | Blanksteen | ............ H04W 4/02 709/203 |
| 2014/0252091 A1* | 9/2014 | Morse | ............ F25D 29/00 235/385 |
| 2014/0266669 A1* | 9/2014 | Fadell | ............ G05B 19/042 340/501 |
| 2014/0379296 A1 | 12/2014 | Nathan et al. | |
| 2015/0041616 A1* | 2/2015 | Gentile | ............ A47F 10/00 248/550 |
| 2015/0112759 A1* | 4/2015 | Hong | ............ G06Q 30/0631 705/7.29 |
| 2015/0186836 A1* | 7/2015 | Chouhan | ............ G06Q 10/087 705/28 |
| 2015/0262120 A1* | 9/2015 | Kulig | ............ G06Q 10/087 705/28 |
| 2015/0310601 A1 | 10/2015 | Rodriguez et al. | |
| 2015/0379467 A1* | 12/2015 | Skaaksrud | ............ G06F 21/6245 705/338 |
| 2016/0048798 A1* | 2/2016 | Meyer | ............ G01G 19/4144 705/28 |
| 2016/0140526 A1* | 5/2016 | Cummins | ............ G06Q 10/08 705/28 |
| 2016/0162715 A1* | 6/2016 | Luk | ............ F25D 29/005 235/385 |
| 2016/0165387 A1* | 6/2016 | Nhu | ............ H04L 67/10 455/41.1 |
| 2017/0004828 A1* | 1/2017 | Lee | ............ G06F 3/012 |
| 2017/0109687 A1* | 4/2017 | Kamadolli | ............ G06Q 30/0201 |
| 2017/0255680 A1* | 9/2017 | Malatesha | ............ G06F 17/30522 |
| 2017/0357661 A1* | 12/2017 | Hornkvist | ............ G06F 17/30392 |
| 2018/0108066 A1* | 4/2018 | Kale | ............ G06F 17/30247 |
| 2018/0129998 A1* | 5/2018 | Frazier | ............ G06Q 10/06315 |
| 2018/0197533 A1* | 7/2018 | Lyon | ............ G10L 15/16 |
| 2018/0210702 A1* | 7/2018 | Shim | ............ G06F 3/167 |
| 2018/0232817 A1* | 8/2018 | Isaacson | ............ G06Q 30/0613 |
| 2018/0233139 A1* | 8/2018 | Finkelstein | ............ G06K 9/726 |
| 2018/0239967 A1* | 8/2018 | Matsuoka | ............ G06K 9/00771 |
| 2019/0095607 A1* | 3/2019 | Howard | ............ G06F 21/41 |

OTHER PUBLICATIONS

International Search Report and Written Opinion in PCT/US2017/038719, dated Feb. 14, 2018.

* cited by examiner

SPEECH-BASED STORAGE TRACKING

BACKGROUND

The ways to manage inventory, particularly in a household, can be improved. For instance, keeping track of the various products stored in a refrigerator—where is a product, is there any left, how much is left, etc. are often questions people have, especially when there are many people using the product at different times. While using electronic devices to assist with managing inventory is useful, challenges remain to configure these devices to properly track and aid in performing the inventory management. Through innovation, technical solutions to improve machines are provided herein to help people know where and how much of a product is available for use.

DETAILED DESCRIPTION

Figure 1:
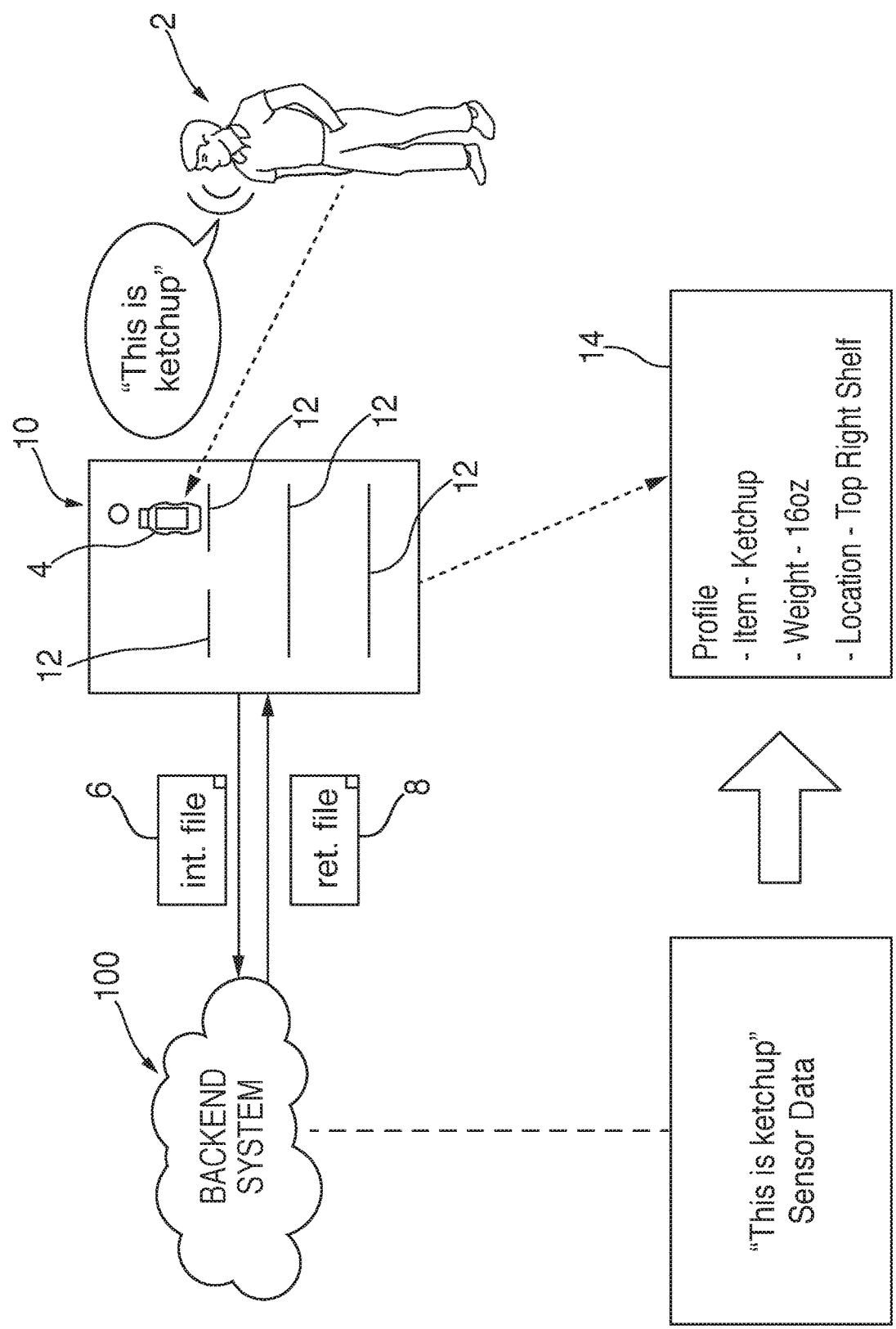
FIGS. 1-4 are illustrative diagrams of various exemplary systems for managing inventory, in accordance with various embodiments.

The present disclosure, as set forth below, is generally directed to various embodiments of methods and devices related to tracking objects such as, for example, consumable items. A storage unit, such as a refrigerator, may include one or more sensors and electronics to assist with managing the physical items stored therein, as well as properties of those physical items. For example, the storage unit may include one or more shelving units having one or more sensors incorporated therein, such that the storage unit may determine, and track, a location of a physical item placed on one of the shelving units, as well as a weight or mass that physical item. In some embodiments, the shelving units may include thin weight sensors that are arranged in a grid type pattern such that a two-dimensional sensory array is formed. The sensor array may be used to determine a particular location on the shelving unit with which a physical item is located such that, as the number of sensors of the array is increased, the precision of a particular physical item's location may also increase.

In an illustrative, non-limiting embodiment, an individual may speak an utterance including a name of, or information associated with, a physical item or physical items being placed within the storage unit. For example, an individual may place a bottle of ketchup in their refrigerator, and may say, "Alexa, this is ketchup." In this particular scenario, audio data representing the utterance, which may include the wakeword (e.g., "Alexa") subsequently followed by one or more words (e.g., "this is ketchup"), may be sent to a backend system. In some embodiments, a user account on the backend system may be associated with a particular device identifier of the storage unit, such that information related to the storage unit may be tracked using the backend system. In some embodiments, however, the tracking may be performed by an inventory management system, which is capable of communicating with the refrigerator and/or the backend system. For example, an individual's user account on the backend system may be associated with a device profile on the inventory management system associated with the particular device identifier. Sensor data from the storage unit can likewise be received by the backend system and/or sent to the inventory management system along with a timestamp or other data. This may allow the received audio data to be associated with the sensor data. For example, the term "ketchup" may be associated with a particular location within the refrigerator on which the ketchup bottle was placed, and this information may be stored within the device profile for the user.

In some embodiments, an individual may be prompted to provide a name of the physical item that was recently placed within, or moved about, the storage unit. For example, a sensor of a shelving unit within the storage unit may sense when a physical item is placed on the shelving unit due to a change in the sensor's readings. If the physical item cannot be identified programmatically, the storage unit may output or cause another device to output an audio message, such as, "What item did you just place in the refrigerator?" to prompt the user to provide the name of the physical item. The storage unit may include one or more microphones or transducers to capture audio signals of an utterance spoken in response to the audio message. The storage unit, in one embodiment, may then be configured to send audio data representing the utterance to a backend system, which may generate text data representing the audio data. The backend system may then be capable of determining an intent of the utterance. For instance, the utterance may indicate a name of the physical item that was just placed in the storage unit.

In some embodiments, the backend system and/or the storage unit may also be in communication with an inventory management system, which may be provided with the name, and various other data associated with the physical item, to assist in monitoring and managing the physical items stored within the storage unit. For instance, the storage unit may also capture sensor data from the one or more sensors associated with a location within the storage unit where the physical item was placed, and may send that sensor data to the inventory management system. The inventory management system may, in turn, send that information along with the determined name of the physical item to the backend system and/or storage unit. As an illustrative example, the sensor data may represent a weight of the physical item, and/or correspond to a specific location within the storage unit. In some embodiments, however, the backend system may include the inventory management capabilities. In this particular scenario, the storage unit may send sensor data, as well as audio data, if received, to the backend system.

In some embodiments, the backend system may include automatic speech recognition ("ASR") functionality, which may be used to generate text data representing the audio data. Furthermore, the backend system may also include natural language understanding functionality that is capable of determining an intent of the utterance. For example, if the utterance is, "This is ketchup," the backend system may determine, using the text data, that the word "ketchup" is associated with the physical item that was placed in the storage unit, and may associate the sensor data with that word. In some embodiments, in addition to receiving audio data representing the utterance, the backend system may receive a device identifier (e.g., one or more letters, numbers, or characters) that is associated with the storage unit. The device identifier may be used, in an illustrative embodiment, to specify a particular functionality of the backend system to be used. For example, the natural language understanding functionality may include an inventory management domain such that, when a device identifier is received, the inventory management domain may be used for servicing an intent of the utterance.

In some embodiments, the inventory management system may generate a profile for the physical item, which may include the name of the physical item determined by the text data as well as a weight and/or location of the physical item determined using the sensor data. The backend system may also determine if a profile stored by the inventory management system already exists for the physical item and, if so, may update the profile to include the name of the physical item determined as well as a weight and/or location of the physical item determined using the sensor data.

After an item's profile on the inventory management system has been generated, a weight of the physical item at various times, as detected by an associated sensor, may be tracked and stored within the physical item's profile. In some embodiments, the sensor(s) associated with the physical item may continually or periodically, send sensor data indicating a current weight of the physical item (or an object, or lack of object placed on the sensor(s)) to the inventory management system, or the sensor data may be sent to the backend system, which may in turn also send the sensor data to the inventory management system. In some embodiments, the backend system and/or inventory management system may determine a change in the weight by determining a difference in a current weight detected by the sensor(s) as compared to a most recent weight. For example, when an item is removed from, or placed in, the storage unit, a trigger may be generated that causes the storage unit to send sensor data along with a timestamp, indicating the time the sensor data was obtained, to the backend system and/or inventory management system. Using the sensor data, the backend system and/or inventory management system may determine that whether the item has been removed from the storage unit, placed within the storage unit, or moved to a different location within the storage unit, as well as a change, if any, of the item's weight. For example, the inventory management system may determine a difference between a current weight and a most recent weight as determined by that sensor, as stored within the physical item's profile. If the difference equals the most recent weight, then the physical item was likely moved from its previous location within the storage unit.

In some embodiments, the backend system and/or inventory management system may cross-reference the sensor data with the locations and weights stored in profiles associated with the physical items in the storage unit. After determining the location that a physical item has been removed from, the identity of the physical item may be determined by locating the profile associated with the location. When a physical item is placed back in the storage unit, the inventory management system may attempt to automatically identify the physical item. For example, if a physical item, such as a consumable product, is placed in the storage unit within a predetermined amount of time of a physical item being removed from the storage unit, and the physical item placed in the storage unit is within a threshold weight of the physical item removed from the storage unit, then the inventory management system may determine that the physical item placed in the storage unit is the same physical item that was removed from the storage unit. The inventory management system may update the profile of the physical item by adding its new location and current weight, as determined by an associated sensor, to the profile associated with the physical item. If the inventory management system is not able to automatically identify the physical item, the inventory management system may cause the backend system and/or the storage unit to prompt the user to identify the physical item that was just placed in the storage unit.

In some embodiments, the backend system and/or inventory management system may track the weight of the physical item and issue a notification when the weight of the physical item falls below a predetermined threshold value. This threshold value can be established in a number of different ways such as, for example, as a set percentage from the initial value (e.g., ten percent remaining such that a 16 ounce bottle of ketchup would cause a notification to issue when the weight falls below 1.6 ounces), or a fixed amount (e.g., 3 ounces such that less than 3 ounces of ketchup would cause a reorder option or other type of notification to be sent to the storage unit and/or other user device). Accordingly, each time a user places an item back in to the storage unit, the storage unit may capture new sensor data including the updated weight of the physical item after a portion of the physical item has been consumed. The storage unit may send the new sensor data to the inventory management system and the inventory management system may update the profile for the physical item with the new sensor data. For example, the inventory management system may update the profile to include the new weight of the physical item. In some embodiments, if the new weight is below the predetermined threshold value, the inventory management system may generate a notification, or cause the backend system to generate a notification, such as a notice that the physical item needs to be re-ordered, to be sent to the storage unit. In other embodiments, the inventory management system may skip the notification and directly re-order the physical item when the new weight is determined to be below the predetermined threshold value.

In some embodiments, an individual may speak an utterance asking for a location of a physical item within the storage unit. For example, an individual may ask, "Where is the ketchup?" The storage unit may include one or more microphones or transducers that are capable of receiving audio signals of the utterance, and the storage unit may send audio data representing the utterance to the backend system. In some embodiments, the backend system may generate text data that represents the audio data by performing speech-to-text processing on the audio data, and may determine an intent of the utterance using natural language understanding ("NLU") functionality. For example, the backend system may determine that the utterance asked for the location of the physical item (e.g., "Where is the ketchup?"). The backend system may, in conjunction with the inventory management system, determine a profile of the physical item and, based on the profile, may determine a location of the physical item within the storage unit based on the sensor data that was received and/or the name of the physical item determined. The inventory management system may send text data representing a response that indicates the location of the physical item to the backend system, which may generate and send audio data representing the text data to the storage unit. For example, the inventory management system may determine that an object named "ketchup" is associated with a first sensor, which is located on an upper left shelf within the storage unit. The inventory management system may then determine a response that indicates that the object is located on the upper left shelf, and send text data representing the response to the backend system (e.g., "The ketchup is on the upper left shelf.") The backend system may generate audio data representing the text data, and may send the audio data to the storage unit, which may then output the audio data using one or more speakers located thereon.

It will be appreciated by those having ordinary skill in the art that the storage unit, inventory management system, and backend system may, individually and/or in combination, track the weights and/or locations multiple physical items. For example, profiles associated with various physical items stored within the storage unit may be generated and stored by the storage unit, the inventory management system, and/or the backend system. When physical items are removed from the storage unit, as well as when physical items are placed back in the storage unit, updated sensor data (e.g., an updated weight and/or location for the physical item) for those physical items may be sent to the backend system, which in turn may update that physical item(s) corresponding profile. Additionally, a physical item's profile may include a map of the physical item's location, an initial weight of the physical item, a most recent weight of the physical item, and/or any other suitable information associated with the physical item. Furthermore, a physical item's profile may also include additional information related to unknown objects that have been detected by the sensors, but have not been identified by the user.

In some embodiments, the storage unit, or one or more electronic devices in communication with the storage unit, may be a sound controlled electronic device. A sound controlled electronic device, as described herein, may correspond to any device capable of being activated in response to detection of a specific word (e.g., a word, a phoneme, a phrase or grouping of words, or any other type of sound, or any series of temporally related sounds). For example, a voice activated electronic device is one type of sound controlled electronic device. Such voice activated electronic devices, for instance, are capable of generating and sending audio data to a backend system, such as the backend system mentioned previously, in response to detecting a wakeword. Spoken voice commands, in some embodiments, may be prefaced by a wakeword, which may also be referred to as a trigger expression, wake expression, or activation word. In response to detecting an utterance of the wakeword, a voice activated electronic device may be configured to detect and interpret any words that subsequently follow the detected wakeword as actionable inputs or commands. In some embodiments, the voice activated electronic device may be activated by a phrase or grouping of words, which the voice activated electronic device may also be configured to detect. The voice activated electronic device, therefore, may also be able to detect and interpret any words subsequently following that phrase or grouping of words.

As used herein, the term "wakeword" may correspond to a "keyword" or "key phrase," an "activation word" or "activation words," or a "trigger," "trigger word," or trigger expression." One exemplary wakeword may be a name, such as the name, "Alexa," however persons of ordinary skill in the art will recognize that any word (e.g., "Amazon"), or series of words (e.g., "Wake Up" or "Hello, Alexa") may alternatively be used. Furthermore, the wakeword may be set or programmed by an individual operating a voice activated electronic device, and in some embodiments more than one wakeword (e.g., two or more different wakewords) may be available to activate a voice activated electronic device. In yet another embodiment, the trigger that is used to activate a voice activated electronic device may be any series of temporally related sounds.

In some embodiments, an individual may speak an utterance to their electronic device, such as a storage unit. As an illustrative example, an individual may say an utterance to their storage unit that is prefaced by a wakeword. In this instance, the utterance may begin with the wakeword, which may then be subsequently followed by an invocation and an action, command, or question, request. For example, an individual may say "Alexa—This is ketchup'," or "Alexa—Where is the milk?", or "Alexa—Good Morning." Thus, in response to detecting the utterance of the wakeword, "Alexa," the voice activated electronic device may send audio data representing the utterance (e.g., "Alexa—Where is the milk?") to the backend system.

A sound controlled electronic device, such as a voice activated electronic device, may monitor audio input data detected within its local environment using one or more microphones, transducers, or any other audio input device located on, or in communication with, the voice activated electronic device. The voice activated electronic device may, in some embodiments, then provide the audio data representing the detected audio input data to the backend system for processing or analyzing the audio data, and providing a response to the audio data for the voice activated electronic device, as well as, or alternatively, providing an additional action directed at another device (e.g., a target device). Additionally, the voice activated electronic device may store one or more wakewords within its local memory. If a determination is made that audio data received from the audio input device(s) (e.g., microphone(s)) matches the wakeword, the voice activated electronic device may begin sending all of the audio data to a backend system.

A sound controlled electronic device may also correspond to a sound activated electronic device that may be triggered by a non-verbal sound. For example, a door opening, an alarm going off, glass breaking, a telephone ringing, or any other sound may alternatively be used to activate a sound activated electronic device. In this particular scenario, detection of a non-verbal sound may occur in a substantially similar manner as that of a verbal wakeword for a voice activated electronic device. For example, a door opening, when detected by a door sensor, may activate the sound activated electronic device, which may in turn cause the backend system to request current sensor data for one or more sensors associated with the device, such as a storage unit including one or more smart shelves.

In some embodiments, the electronic device with which the utterance is spoken may, alternatively, correspond to a manually activated electronic device. A manually activated electronic device, as described herein, may correspond to a device to that is capable of being activated in response to a manual input from an individual (e.g., pressing a button, touching a portion of touch screen, performing an action on a device, etc.). For example, a tap-to-talk electronic device is on type of manually activated electronic device. Such tap-to-talk electronic devices, for instance, are capable of obtaining and outputting audio data in response to a button being pressed by an individual.

In some embodiments, an individual may activate their manually activated electronic device (e.g., by pressing a button), and may utter a command for a media item to be played on a particular target electronic device. For example, an individual may press a button on their manually activated electronic device, and may say, "Alexa—Where is the ketchup?" The manually activated electronic device may then send audio data representing the utterance to a backend system. In some embodiments, an individual may activate their manually activated electronic device using a manual trigger located on an additional electronic device in communication with the manually activated electronic device. For example, an individual may press a button on tablet or mobile phone that causes an indication to be sent to the manually activated electronic device to activate it. In response, the manually activated electronic device may be configured to receive audio data representing an utterance received by a microphone of the manually activated electronic device, and/or an additional electronic device, and in turn may send that audio data to the backend system for processing.

FIG. 1 is an illustrative diagram of a system for tracking physical items, in accordance with various embodiments. In one exemplary non-limiting embodiment, an individual 2 may place a physical item 4 in a storage unit 10 such as, for example and without limitation, a refrigerator. However, various other types of storage units may include, but are not limited to, pantries, drawers, cabinets, dressers, closets, cupboards, tractor trailer containers, medical supply cabinets, home pantries, retail store shelves, luggage systems, delivery vans/trucks, and the like. Storage unit 10 may include one or more shelves 12. Shelves 12 may include one or more sensors capable of determining a weight of a physical item, such as physical item 4, and which of shelves 12 physical item 4 is placed on. In addition to determining which of shelves 12 physical item 4 is placed on, the sensors may each be associated with a particular location within storage unit 10 such that a physical item's location on shelf 12, and therefore within storage unit 10, may be known based on the particular sensor or sensors that determine the weight of the physical item. The sensors may be thin weight sensors arranged in grids on shelves 12 and are described in greater detail below with reference to FIG. 9. In some embodiments, each sensor may output an electrical signal whose magnitude is proportional to the amount of force, or weight, being applied to the sensor. Storage unit 10 may generate sensor data based on electrical signal outputs from the sensors. The sensor data may include information indicating an amount of weight currently residing at a particular location on one of shelves 12 of storage unit 10. In some embodiments, a timestamp may also be associated with the sensor data, where the timestamp indicates a time that the sensor data was determined by a particular sensor. Storage unit 10 may continuously gather sensor data or it may gather sensor data at predetermined intervals. For example, storage unit 10 may periodically poll each sensor to determine a current load applied to each sensor, and therefore an amount of force or weight applied to each sensor, or storage unit 10 may determine a current amount of force applied to each sensor in response to a particular input, such as in response to a trigger (e.g., a wakeword being spoken, a button being pressed, a door of storage unit 10 opening, etc.).

Storage unit 10 may be an electronic device including microphone(s) to capture speech of individual 2 and speaker(s) to output an audible response to individual 2. Storage unit 10 may also be configured to communicate with a backend system 100 by, for example and without limitation, sending information such as initial file 6 to backend system 100 and receiving information such as return file 8 from backend system 100. Backend system 100 may include various modules to facilitate processing of information received from storage unit 10 and for generating information in response to the information received from storage unit 10. Specific architectures for storage unit 10 and backend system 100 are described below in more detail with respect to FIG. 6. In some embodiments, backend system 100 may include inventory management functionality, such that backend system 100 is capable of tracking sensor data received from storage unit 10. However, in some embodiments, storage unit 10 may send sensor data associated with one or more of its sensors to a separate inventory management system to monitor and track information associated with the contents stored by storage unit 10. Still further, in some embodiments, storage unit 10 itself may include inventory management functionality, such that information associated with items stored therein may be tracked by storage unit 10. As described herein, therefore, backend system 100 may correspond to an inventory management system, and/or be in communication with a separate inventory management system.

Initial file 6 may be sent (e.g. transmitted) over a network, such as the Internet, to backend system 100 using any number of communications protocols. For example, Transfer Control Protocol and Internet Protocol ("TCP/IP") (e.g., any of the protocols used in each of the TCP/IP layers), Hypertext Transfer Protocol ("HTTP"), and wireless application protocol ("WAP"), are some of the various types of protocols that may be used to facilitate communications between storage unit 10 and backend system 100. In some embodiments, storage unit 10 and backend system 100 may communicate with one another via a web browser using HTTP. Various additional communication protocols may be used to facilitate communications between storage unit 10 and backend system 100 including, but not limited to, Wi-Fi (e.g., 802.11 protocol), Bluetooth®, radio frequency systems (e.g., 900 MHz, 1.4 GHz, and 5.6 GHz communication systems), cellular networks (e.g., GSM, AMPS, GPRS, CDMA, EV-DO, EDGE, 3GSM, DECT, IS-136/TDMA, iDen, LTE or any other suitable cellular network protocol), infrared, BitTorrent, FTP, RTP, RTSP, SSH, and/or VOIP.

Backend system 100 may include one or more servers, each in communication with one another and/or storage unit 10. Each server within backend system 100 may be associated with one or more databases or processors that are capable of storing, retrieving, processing, analyzing, and/or generating data to be provided to storage unit 10. For example, backend system 100 may include one or more inventory control servers for storing and processing information related to managing inventory, such as the inventory of storage unit 10. Backend system 100 may, in some embodiments, correspond to a collection of servers located within a remote facility, and individuals may store data on backend system 100 and/or communicate with backend system 100 using one or more of the aforementioned communications protocols.

In accordance with various embodiments, after individual 2 places physical item 4 in storage unit 10, individual 2 may identify physical item 4 by speaking an utterance, "This is ketchup." In some embodiments, storage unit 10 may be configured to record audio of the spoken utterance in response to a trigger. For example, in response to determining that a door of storage unit 10 has been opened, storage unit 10 may be configured to cause sounds received by one or more microphones of storage unit 10 to be recorded. As another example, individual 2 may, alternatively, preface the utterance with a wakeword or trigger expression (e.g., "Alexa"), which in turn may indicate to storage unit 10 that the sounds received by its microphone(s) are to be recorded. In some embodiments, storage unit 10 may prompt individual 2 to identify physical item 4 by outputting a phrase such as, "What is the name of that item?", and may then capture audio representing speech uttered by individual 2 in response to the phrase. Audio data representing the speech or utterance may then be sent to backend system 100 for performing automated speech recognition processing, as well as causing one or more actions to occur. Additionally, storage unit 10 may also capture sensor data representing a weight (e.g., 16 ounces) and location (e.g., top right shelf) of physical item 4. Storage unit 10 may send the audio data and sensor data to backend system 100 in the form of initial file 6, or as multiple individual files, however persons of ordinary skill in the art will recognize that this is merely exemplary. For instance, sensor data representing a weight may, alternatively, be sent to an inventory management system, along with the audio data.

After backend system 100 receives the audio data, backend system 100 may analyze the audio data by, for example, performing automated speech recognition ("ASR") processing on the audio data, such as speech-to-text functionality, to generate text data representing the audio data. Backend system 100 may then apply natural language understanding ("NLU") processing to the text data to determine an intent of the utterance. Accordingly, backend system 100 may determine a name of physical item 4 from the text data such as, for example, "ketchup."

Backend system 100 may also generate a profile 14 corresponding to physical item 4, if such a profile does not yet exist, and may add the determined name of physical item 4 (e.g., "ketchup") to profile 14. Backend system 100 may also add information from the sensor data, such as a weight of physical item 4, and/or a location within storage unit 10 of physical item 4, to profile 14. In some embodiments, profile 14 may be stored as data on backend system 100, such as within a user accounts module associated with a particular user account for individual 2. In some embodiments, however, profile 14 may be generated and/or stored by a separate inventory management system that is in communication with backend system 100 and/or storage unit 10.

In other embodiments, backend system 100 may generate a storage unit profile for storage unit 10 that includes a map of all known physical items within storage unit 10, the physical items respective locations, and/or any other additional information for those physical items (e.g., a current weight, previous weights, threshold weight limits, physical item names, brand names, usage details, etc.). For each of location, the storage unit profile may also include information indicating which sensors within storage unit 10 have physical items stored at a particular location associated with those particular sensors. For each of occupied location, the storage unit profile may include a physical item profile, such as profile 14, associated with a particular physical item determined to be located at that particular location. For instance, a physical item's initial weight and/or current weight, as well as a threshold weight with which a replacement physical item should be ordered, may be included within a particular physical item's profile, which may be stored within the storage unit profile of storage unit 10.

In some embodiments, backend system 100 may attempt to automatically identify physical item 4, rather than having individual 2 provide the identity of physical item 4. For example, after individual 2 has initially identified physical item 4 and profile 14 corresponding to physical item 4 has been generated, backend system 100 may identify physical item 4 without input from individual 2. Upon any change in sensor data (e.g., when a physical item is placed in storage unit 10 or removed from storage unit 10), storage unit 10 may determine a current measurement for one or sensors of storage unit 10, and may send first sensor data, along with a timestamp indicating the time the first sensor data was determined, to backend system 100. Thus, when individual 2 removes physical item 4 from storage unit 10, storage unit 10 may send sensor data representing a weight, or weights, associated one or more sensors of storage unit 10, along with a first timestamp, to backend system 100. In response to an individual placing physical item 4, or any other physical item, back in storage unit 10, storage unit 10 may determine an updated measurement for the one or more sensors, and may send second sensor data along with a second timestamp for that sensor data reading, to backend system 100. Alternatively, storage unit 10 may send the sensor data to an inventory management system, or backend system 100 may send the sensor data to the inventory management system, and persons of ordinary skill in the art will recognize that aforementioned is merely exemplary.

Based on the first sensor data and the second sensor data, backend system 100 may determine whether or not physical item 4 has been removed storage unit 10 and whether a physical item, which may still be physical item 4, has been placed in storage unit 10. For example, profile 14 may include location and weight information associated with physical item 4. When backend system 100 receives the first sensor data from storage unit 10 after physical item 4 is removed from storage unit 10, a determination may be made that no weight is being applied to the one or more sensor(s) associated with a location of physical item 4 as stored in profile 14, which may indicate that physical item 4 has been removed from storage unit 10. When backend system 100 receives the second sensor data from storage unit 10, after physical item 4 has been placed back in storage unit 10, a magnitude of a weight difference between a first weight associated with the first sensor data, and a second weight associated with the second sensor data, may be determined. If the magnitude of the weight equals the second weight, or substantially the second weight (e.g., within 10-15% of the second weight), then that may indicate that physical item 4 has been used slightly, and placed back within storage unit 10 at a same location. Upon determining that physical item 4 has been placed in storage unit 10, and that the current weight is substantially similar to a previous weight associated with the physical item located at that particular location, backend system 100 may attempt to automatically determine the identity of the physical item as being the same physical item that previously was located at that location within storage unit 10.

In some embodiments, backend system 100 may use weight and temporal information to attempt to identify a physical item. For example, if backend system 100 determined that physical item 4 was recently removed from storage unit 10, backend system 100 may determine that a physical item placed in storage unit 10 within a predetermined time of physical item 4 being removed from storage unit 10 and having a weight within a predetermined weight of physical item 4, is, in fact, physical item 4. Backend system 100 may also use other information to help to automatically identify a physical item placed in storage unit 10. In some embodiments, sensor data may include a size of physical item 4 that may be stored in profile 14 by backend system 100 and/or an inventory management system. For example, physical item 4 may be large enough to such that several sensors detect a force being applied to them, and that size information may be stored in profile 14. Sensing a physical item having the same size (i.e., spans the same number of sensors) as a recently removed physical item may indicate that the same physical item has been placed back in storage unit 10. Alternatively, a physical item having a different size than a recently removed physical item may indicate that the same physical item has not been placed back in storage unit 10.

Backend system 100 may attempt to automatically identify a physical item placed in storage unit 10 may have an associated confidence factor. For example, a higher confidence factor may indicate that the physical item may have been correctly identified, whereas and a lower confidence factor may indicate that the physical item may be less likely to have been correctly identified. Backend system 100 may respond differently based on the confidence factor. For example, the confidence factor may fall within a predefined lower tier, a middle tier, or an upper tier. When the confidence factor is in the lower tier, it may indicate that the physical item is unlikely to have been correctly identified. In some embodiments, when the confidence factor is in the lower tier, backend system 100 may proceed by generating audio data requesting a name of the physical item placed in storage unit 10, and may send that audio data to storage unit 10 so that individual 2 may clarify the physical item's identify. When the confidence factor is in the middle tier, backend system 100 this may indicate that the physical item has been correctly identified, and backend system 100 may generate audio data including the name of the potentially identified physical item and requesting confirmation that potentially identified physical item was placed in storage unit 10. For example, backend system 100 may cause storage unit 10 to output the phrase "Did you just place ketchup in the refrigerator?" When the confidence factor is in the upper tier, backend system 100 is likely to have correctly identified the physical item and may proceed, without confirmation from individual 2, with updating the profile associated with the physical item to include the new location and weight of the physical item. In some embodiments, the confidence factor may fall in the middle tier when a physical item is placed in storage unit 10 within a predetermined temporal window threshold of a physical item being removed from storage unit 10, but the weight of the physical item placed in storage unit 10 is not within a predetermined threshold weight of the physical item removed from storage unit 10. The difference in weight may make it unclear as to whether the same physical item was placed back in storage unit 10, and therefore backend system 100 may proceed with confirming the name of the physical item placed in storage unit 10. If a physical item is placed in storage unit 10 within a predetermined threshold time of a physical item being removed from storage unit 10, and the weight of the physical item placed in storage unit 10 is within a predetermined threshold weight of the physical item removed from storage unit 10, the confidence factor may be in the upper tier and backend system 100 may not need to confirm the identity of the physical item.

Backend system 100 may similarly attempt to automatically identify multiple physical items that are removed from and then placed back in storage unit 10. For example, when individual 2 removes three physical items from storage unit 10, the removal of each physical item may trigger storage unit 10 to send sensor data associated with one or more sensors of storage unit 10 (e.g., all the sensors or only sensors that have detected a change) to backend system 100. Backend system 100 may analyze each instance of sensor data to identify the three physical items that were removed from storage unit 10. When one of the physical items is placed back in storage unit 10, the placement of the physical item in storage unit 10 may trigger storage unit 10 to again send sensor data to backend system 100. The sensor data may include a weight of the physical item placed back in storage unit 10 and backend system 100 may determine whether the weight of the physical item is within a threshold weight value of any of the three physical items removed from storage unit 10. If the weight of the physical item is within the threshold weight value of a first one of the physical items, but not the two other physical items that were removed from storage unit 10, backend system 100 may determine that there is a high confidence factor that the physical item placed back in storage unit 10 is the first one of the physical items. However, if the physical item that is placed back in the storage unit 10 is within the threshold weight value of two or more of the physical items, backend system 100 may determine that there is a low confidence factor in identifying the physical item and backend system 100 may generate audio data prompting individual 2 individual to identify which physical item was placed back in storage unit 10 (e.g., "What item did you just place in the refrigerator?"). Backend system 100 may also use additional information, such as the size of the physical items removed from and placed back in storage unit 10 in order to attempt to identify the physical item with a higher confidence factor. For example, even if the physical item placed back in storage unit 10 is within a threshold weight value of two or more of the physical items removed from storage unit 10, if the size of the physical item placed back in storage unit 10 is similar to only one of the physical items removed from storage unit 10, backend system 100 may determine that it can identify the physical item with a high confidence factor.

Figure 2:
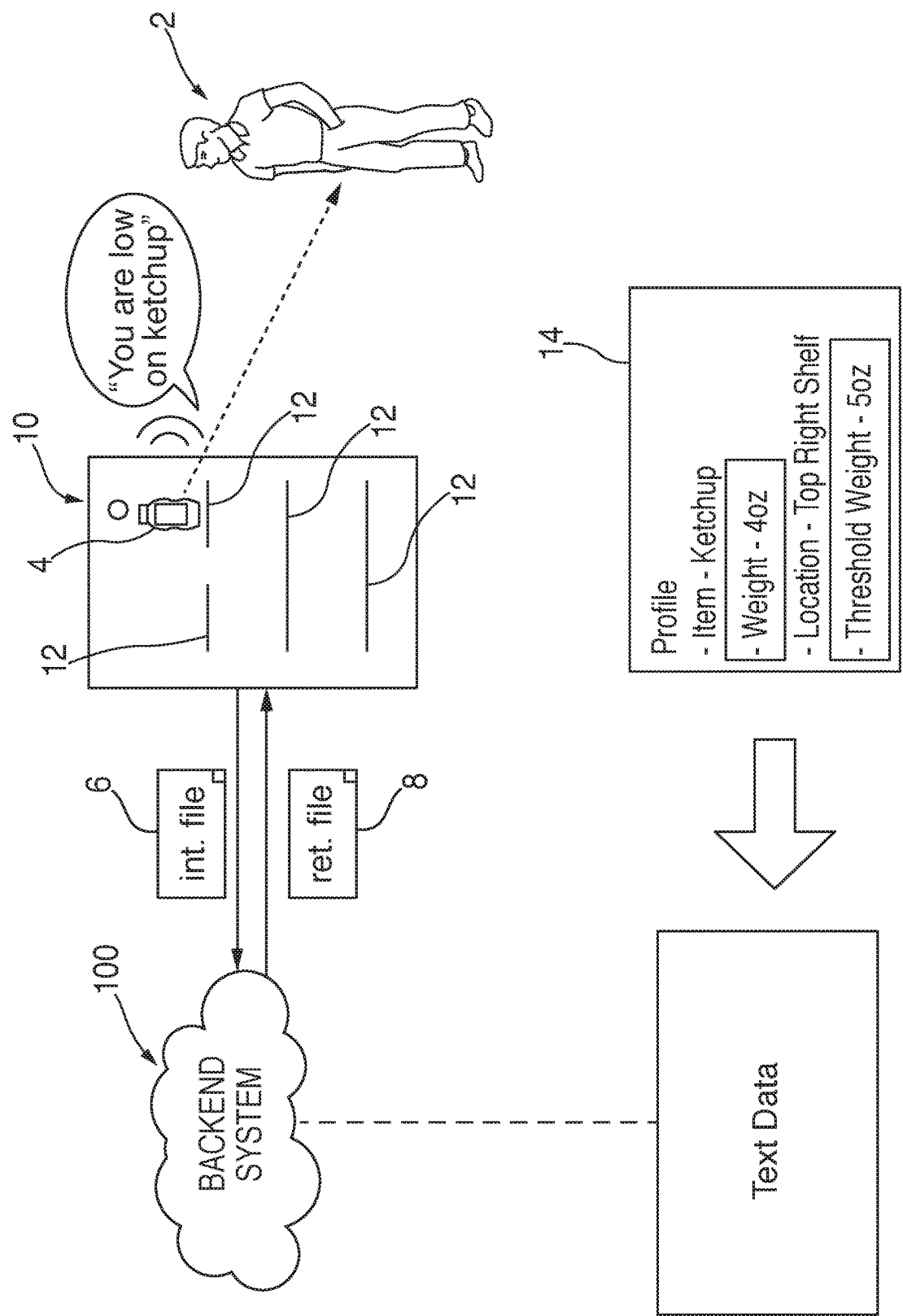

FIG. 2 is another illustrative diagram of a system for tracking physical items, in accordance with various embodiments. In one non-limiting example embodiment, a notification message may be output by storage unit 10 for notifying individual 2 that a current amount of a given physical item, such as physical item 4, may have fallen below a predetermined threshold. As described above, storage unit 10 may be configured to send sensor data to backend system 100 each time physical item 4, or any other physical item, has been removed from, or placed back in, storage unit 10, for example. In one embodiment, individual 2 may remove physical item 4 from storage unit 10. When physical item 4 is removed, an amount of force being applied to one or more sensors associated with a first location where physical item 4 was located may change. In response to determining that the amount of force has changed, storage unit 10 may send sensor data representing a weight (e.g., an amount of force) that the one or more sensors determines is being applied to backend system 100. In some embodiments, backend system 100 may determine that no weight is being applied to the one or more sensors associated with the location of physical item 4, which may indicate that physical item 4 may no longer be at the first location.

When individual 2 places physical item 4 back in storage unit 10, storage unit 10 may send the sensor data representing a current weight being applied to the particular sensor(s) to backend system 100. One or more techniques, as mentioned previously, may be used to determine whether the same physical item (e.g., physical item 4) has been placed in storage unit 10 at the first location that was located, indicating that the physical item may have been removed, at least temporarily. Backend system 100 may determine a difference between the weights determined by the sensor(s) associated with the first location by subtracting the previous weight from the current weight to determine, for instance, whether physical item 4 has indeed been placed back in storage unit 10. Alternatively, backend system 100 may ask individual 2 what physical item was just placed within storage unit 10.

Backend system 100 may analyze the various sensor data to determine: (i) whether physical item 4 had been removed from storage unit 10, (ii) whether physical item 4 has been placed back in storage unit 10 at a same location, and (iii) whether a portion of physical item 4 was consumed or used prior to physical item 4 being placed back in to storage unit 10. For example, first sensor data captured when physical item 4 was removed from storage unit 10 may indicate that there is no weight being applied to a first sensor, or sensors, at a first location where physical item 4 was located, and backend system 100 may determine that physical item 4 has been removed. Second sensor data captured when physical item 4 is placed back in to storage unit 10 may indicate a second weight and specific location of physical item 4. Backend system 100 may use various different physical items of information to determine that physical item 4 has been placed back in storage unit 10 rather than a new physical item. For example, if physical item 4 is placed back in storage unit 10 within a predetermined time period after it was removed, backend system 100 may determine that the same physical item, physical item 4, has been placed back in storage unit 10. Additionally, if the sensor data indicates that physical item 4 weighs the same or less (as opposed to more) weight is being applied to the same sensor(s) located at the first location when physical item 4 was removed from storage unit 10, backend system 100 may determine that physical item 4 has been placed back in storage unit 10. By determining that physical item 4 had been removed and placed back in storage unit 10 at a same location, individual 2 may not have to identify physical item 4, however in some embodiments backend system 100 may send audio data to storage unit 10 to output a message to determine an identity of the physical item that was placed within storage unit 10. In the case that backend system 100 may not be able to identify whether physical item 4 was placed back in storage unit 10, backend system 100 may send audio data to storage unit 10 that includes a prompt for individual to identify physical item 4 (e.g., "What physical item is this?").

After identifying physical item 4, backend system 100 may determine that profile 14 corresponding to physical item 4 exists, and/or that data corresponding to physical item 14 exists within a profile for storage unit 10. Backend system 100 may then update the appropriate profile with the new sensor data. For example, if a portion of physical item 4 has been consumed, physical item 4 may have a new, lower weight (e.g., 4 oz.). Profile 14 may be updated to include the current weight as being the new, lower weight, thereby replacing the previous current weight in profile 14. If it is determined that physical item 4 has a new location, profile 14 may be updated to include the new location.

In some embodiments, profile 14 may include a predetermined threshold weight (e.g., 5 oz.) indicating when physical item 4 should be reordered. The predetermined threshold may be set by the user, may be a default setting, and the user may further have the option of changing threshold. As an illustrative example, the initial weight of physical item 4, as stored within profile 14, may have been 12 oz., whereas a current weight, as determined by one or more sensors of storage unit 10, may be 4 oz. Backend system 100 may determine that the weight of physical item 4 less than the predefined threshold weight, such as 5 oz., and, in response, may generate a notification that the current weight associated with physical item 4 is less than the predefined threshold for ordering a replacement physical item for physical item 4. In some embodiments, backend system 100 may generate audio data representing a notification, and may send the audio data to storage unit 10 such that an audio message of the notification may be output by storage unit 10. For example, storage unit 10 may play a notification message for individual 2 that indicates that the amount of physical item 4 is low and that a replacement for physical item 4 may be needed (e.g., "You are low on ketchup" or "You are low on ketchup. Do you want to order a new bottle?"). In some embodiments, backend system 100 may, in response to determining that the current weight for physical item 4 is less than the predefined threshold weight, automatically order a replacement for physical item 4. In some embodiments, backend system 100 may send display data to be displayed on a display of storage unit 10 or on another electronic device such as a mobile phone, computer, and/or any other suitable device.

In some embodiments, backend system 100 may send an order request for a replacement for physical item 4 to a fulfillment system to physically ship the replacement to an address associated with storage unit 10. For instance, a user account associated with storage unit 10 may include a mailing address for individual 2, and may send the mailing address, as well as any other suitable criteria for ordering the replacement (e.g., billing address, credit card information, confirmation email address, etc.), to the fulfillment system. In some embodiments, a user profile stored on backend system 100 may include one or more vendors designated by the user as appropriate for ordering replacement goods automatically. In some of those instances, the user may elect to receive a confirmation message from backend system 100 prior to the order actually being placed that requires the user to confirm that the automatically prepared order should indeed be placed. This may provide the user with the opportunity to cancel, modify, or complete an order for the replacement. In other embodiments, backend system 100 may access one or more applications to search for vendors offering the best pricing for the replacing the physical item(s) and backend system 100 may provide the user with a list of those vendors along with the vendor's current pricing for the replacement. In still other embodiments, backend system 100 may rank multiple vendors based on an overall pricing, rating, or any other ranking means, of all of the physical items that have been identified as needing to be replaced within a predetermined time period, such as, for example, the following week, based on current weights of physical items within storage unit 10.

Figure 3:
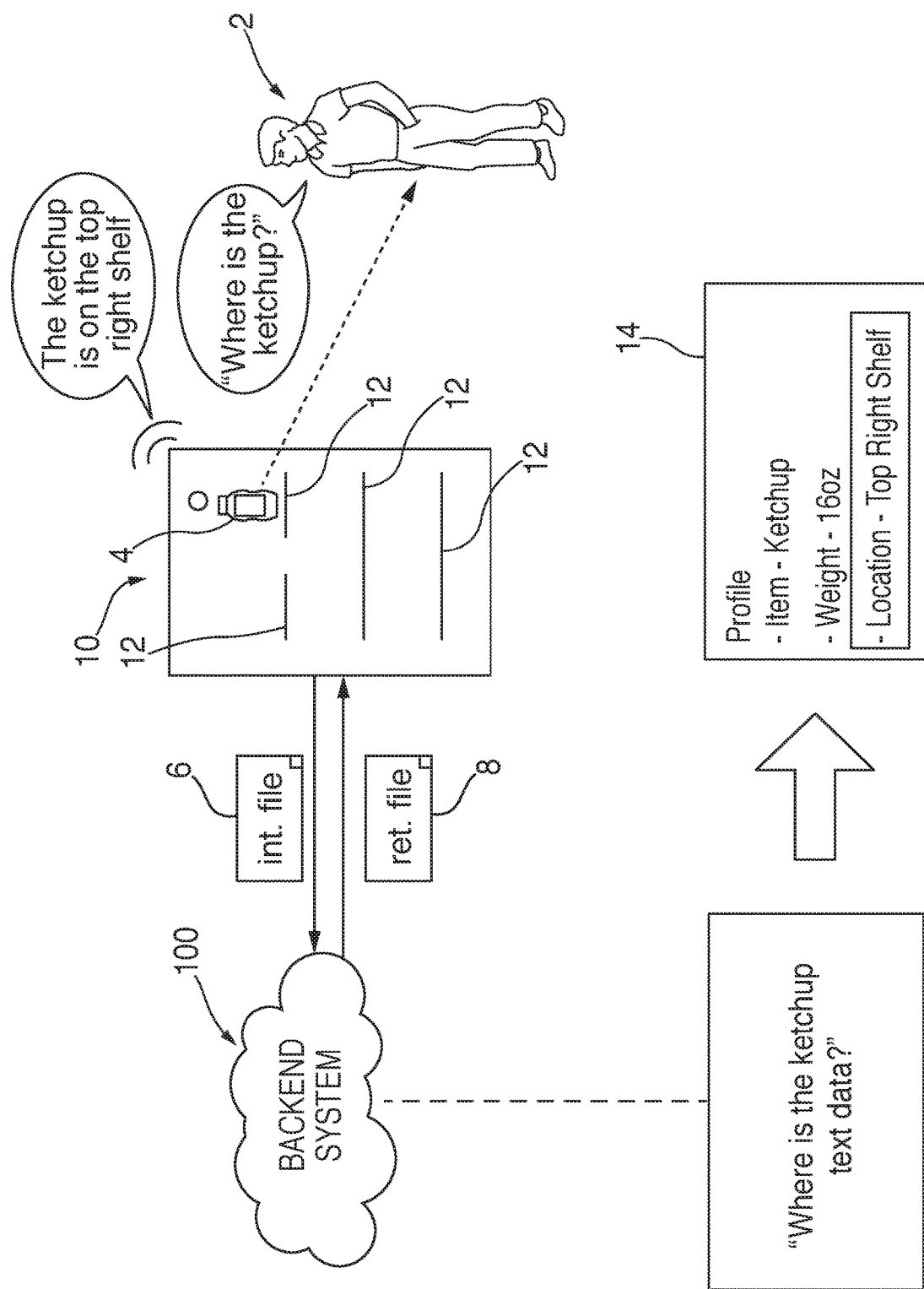

FIG. 3 is an illustrative diagram of another system for tracking physical items, in accordance with various embodiments. In one non-limiting embodiment, FIG. 3 shows an example of providing an individual with a location of physical item 4 within storage unit 10 in response to receiving an utterance requesting a current location within storage unit 10 of physical item 4. If individual 2 would like to locate physical item 4 within storage unit 10, individual 2 may speak an utterance, "Where is the ketchup?" to storage unit 10. In some embodiments, storage unit 10 may include sound controlled functionality, such that a trigger expression, phrase, or input may be used to activate storage unit 10. In response to being activated, audio captured by one or more microphones of storage unit 10 may be capture, and audio data representing the audio, which includes the utterance that requested for a current location of physical item 4, may be sent backend system 100. Backend system 100 may perform speech processing on the audio data to determine an intent of the utterance, as well as determine a response to the utterance and/or an action to be performed.

Backend system 100, for instance, may determine that the audio data includes a request for a location of an object, having an object identifier, within storage unit 10 (or on a portion of storage unit 10). In response, backend system 100 may determine a physical item profile having the object name located within a device profile of storage unit 10 (e.g., {Object Name}: ketchup), such as physical item 4. The profile of physical item 4 may also include its current location within storage unit 10, which may be associated with one or more sensors, or a particular intersection point of a grid array of sensors of one of shelves 12. In some embodiments, profile 14 may be stored on an inventory management system. For example, the inventory management system may be in communication with backend system 100, such that the inventory management system stores various device profiles associated with various devices. However, persons of ordinary skill in the art will recognize that inventory management functionality may be included on backend system 100, a separate system, and/or locally on storage unit 10, or any other suitable electronic device, or any combination thereof.

In some embodiments, backend system 100 may receive text data representing a response message indicating a location of physical item 4. For example, backend system 100 may receive the text data from an inventory management system including profile 14, or from local memory storing profile 14. After receiving the text data, backend system may perform text-to-speech processing to generate audio data representing the text data (e.g., "The ketchup is on the top right shelf."). Backend system 100 may then send the audio data to storage unit 10 such that the response message is output by one or more speakers of storage unit 10.

The audio data generated by backend system 100 may represent a phrase that allows individual 2 to locate physical item 4. For example, the location of physical item 4 stored in profile 14 may be a piece of computer readable data that corresponds to the location of physical item 4, but may not necessarily inform individual 2 to locate physical item 4 within storage unit 10. Backend system 100 may include a lookup table or other data structure to associate the location of physical item 4 with audio data that is informative for individual 2 to locate physical item 4. The lookup table may include phrases corresponding to locations with storage unit 10 such as, for example, "top right shelf," "top left shelf," "right door middle shelf," and the like. The lookup table may associate one of the phrases with corresponding location data points. For example, the location data points corresponding to a first sensor, or sensors, on the top left shelf may be associated with the phrase "top left shelf." In some embodiments, the phrases in the lookup table may be more detailed (e.g., "back corner of the top left shelf"). Backend system 100 may also incorporate the name of physical item 4 into the audio data. In some embodiments, backend system 100 may generate the audio data by incorporating the name and location phrase into a standard response template. For example, a standard response template may be "The {PHYSICAL ITEM NAME} is on the {LOCATION PHRASE}." The slot, or field, "PHYSICAL ITEM NAME" may be replaced by a name of physical item 4, and the slot, or field, "LOCATION PHRASE" may be replaced by the phrase from lookup table corresponding to the location of physical item 4, such that the response, "The ketchup is on the top right shelf" may be generated.

Figure 4:
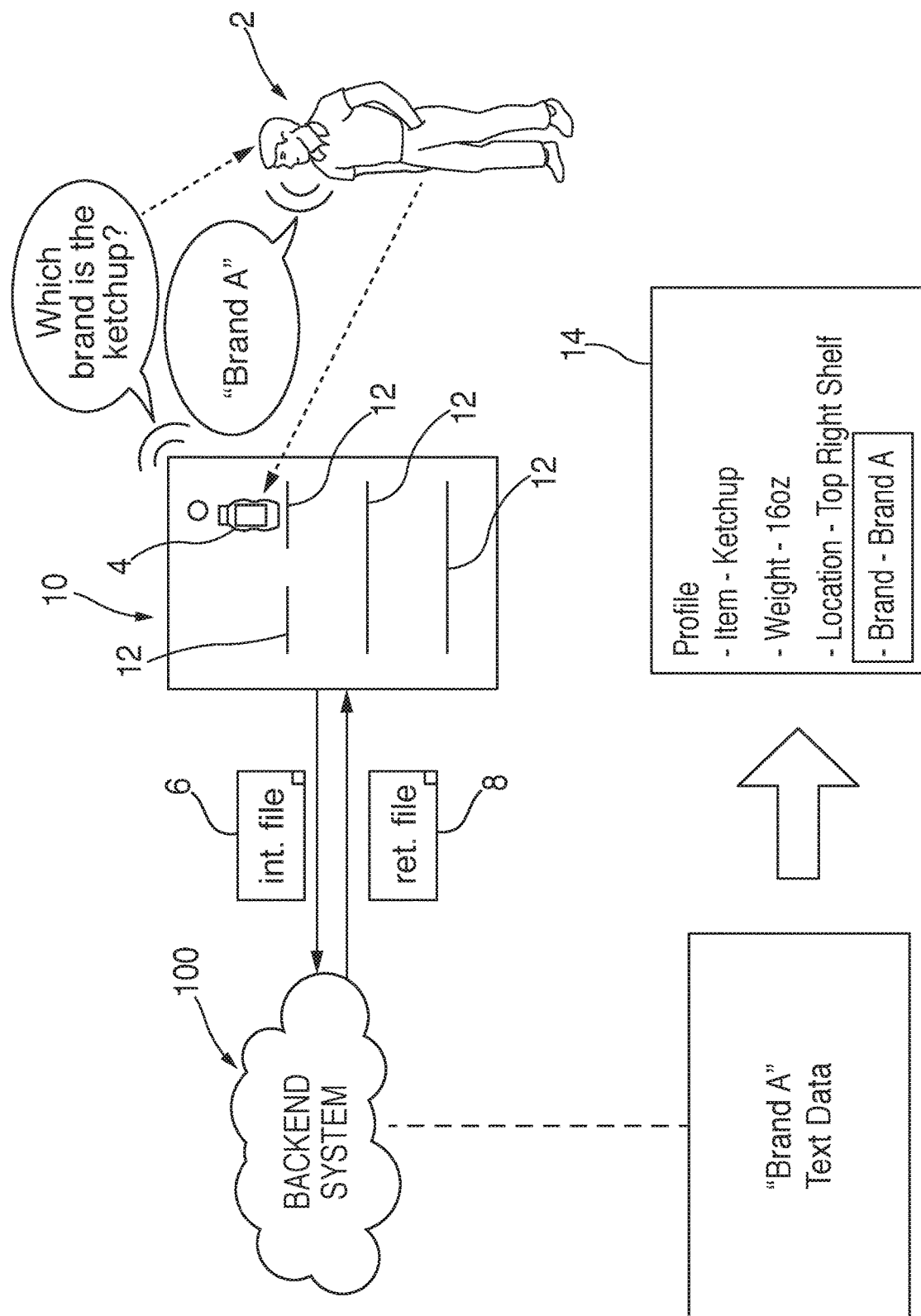

FIG. 4 is an illustrative diagram of another system for tracking physical items, in accordance with various embodiments. In one non-limiting embodiment, FIG. 4 shows an example of additional information being received from individual 2 regarding physical item 4. Individual 2 may be prompted by storage unit 10 to provide additional information about physical item 4 in order to further enhance the user's experience. For example, after individual 2 places physical item 4 in storage unit 10 and identifies physical item 4, as was previously described with respect to FIG. 1, backend system 100 may generate audio data representing a request for additional information about physical item 4, such as "Which brand is that ketchup?" This brand information, or any other additional information (e.g., cost, purchase source, type of physical item, etc.) may be used to build a robust profile 14 for physical item 4, as well as for a storage unit profile for storage unit 10, such that backend system 100 may learn one or more preferences of individual 2, or of a usage of storage unit 10. In some embodiments, text data representing a request for the additional information may be generated, and audio data representing the text data may also be generated using text-to-speech ("TTS") processing. Backend system 100 may send the audio data to storage unit 10, or any other suitable device, in a format (e.g., MP3, MP4, etc.) that can be played by a speaker of storage unit 10, or one or more additional speakers in communication with storage unit 10.

Upon hearing the request for additional information about physical item 4, individual 2 may speak a second utterance, which for instance may be, "Brand A." Storage unit 10 may capture audio input data of the utterance using one or more microphones of storage unit 10 and/or in communication with storage unit 10, and may send audio data representing the utterance to backend system 100. Backend system 100 may analyze the audio data as previously described (i.e., by using ASR and NLU processing) to determine the additional information such that the additional information may be included in an updated version of profile 14, or a device profile corresponding to storage unit 10.

The additional information associated with physical item 4 may be any suitable type of information. For example, the additional information may include a preferred brand, size, item type (e.g., skim milk vs. 2% milk), expiration date, or any other additional information about physical item 4. In some embodiments, the additional information may be used by backend system 100 to identify physical item 4 for reordering purposes. For example, individual 2 may identify physical item 4 as ketchup and backend system 100 may already know a particular brand and size of the ketchup (or other information such as a product identifier number used by a fulfillment system) based on information stored in profile 14, and may order, if so desired, a replacement physical item for physical item 4 using the stored brand and physical item size information. In some embodiments, backend system 100 may gather additional information about physical item 4 without prompting individual 2 for the additional information. For example, some types of additional information such as nutritional facts of physical item 4, a physical item type (e.g., drink, condiment, meat, etc.) of physical item 4, recipes having physical item 4 ingredient, reviews of physical item 4, food pairings with physical item 4, product recalls associated with physical item 4, and the like, may automatically be gathered by backend system 100 and added to profile 14 associated with physical item 4. Backend system 100 may, for example, communicate with information sources such as servers, databases, websites, or other information sources to gather additional information about physical item 4. For example, an inventory management system and/or a fulfillment system may be used to supply profile 14 with current information associated with physical item 4. In some embodiments, backend system 100 may store the additional information about physical item 4 in profile 14 or, alternatively, backend system 100 may store some of the additional information about physical item 4 in profile 14 and may gather other additional information about physical item 4 in real-time in response to a command from individual 4 where the additional information may be relevant (e.g., "How many calories does my ketchup have per serving?").

Backend system 100 may, in some embodiments, use the additional information to generate responses to various utterance from individual 2. For example, when individual 2 requests information on whether there are enough ingredients in storage unit 10 to make a given recipe (e.g., "Do I have the ingredients for macaroni and cheese?"), backend system 100 may locate a recipe for macaroni and cheese and determine whether all the ingredients, and an appropriate amount of those ingredients, are located in storage unit 10 (or one or more additional storage units or systems). For example, backend system 100 may generate responsive audio data such as "You have milk and butter in the fridge. You don't have enough macaroni on the shelf." Furthermore, backend system 100 may generate an additional response to order one or more of the ingredients needed. Continuing the previous example, backend system 100 may generate audio data of a response, "Would you like me to order another box of macaroni?", and may send the audio data to storage unit 10 to be output.

Figure 5:
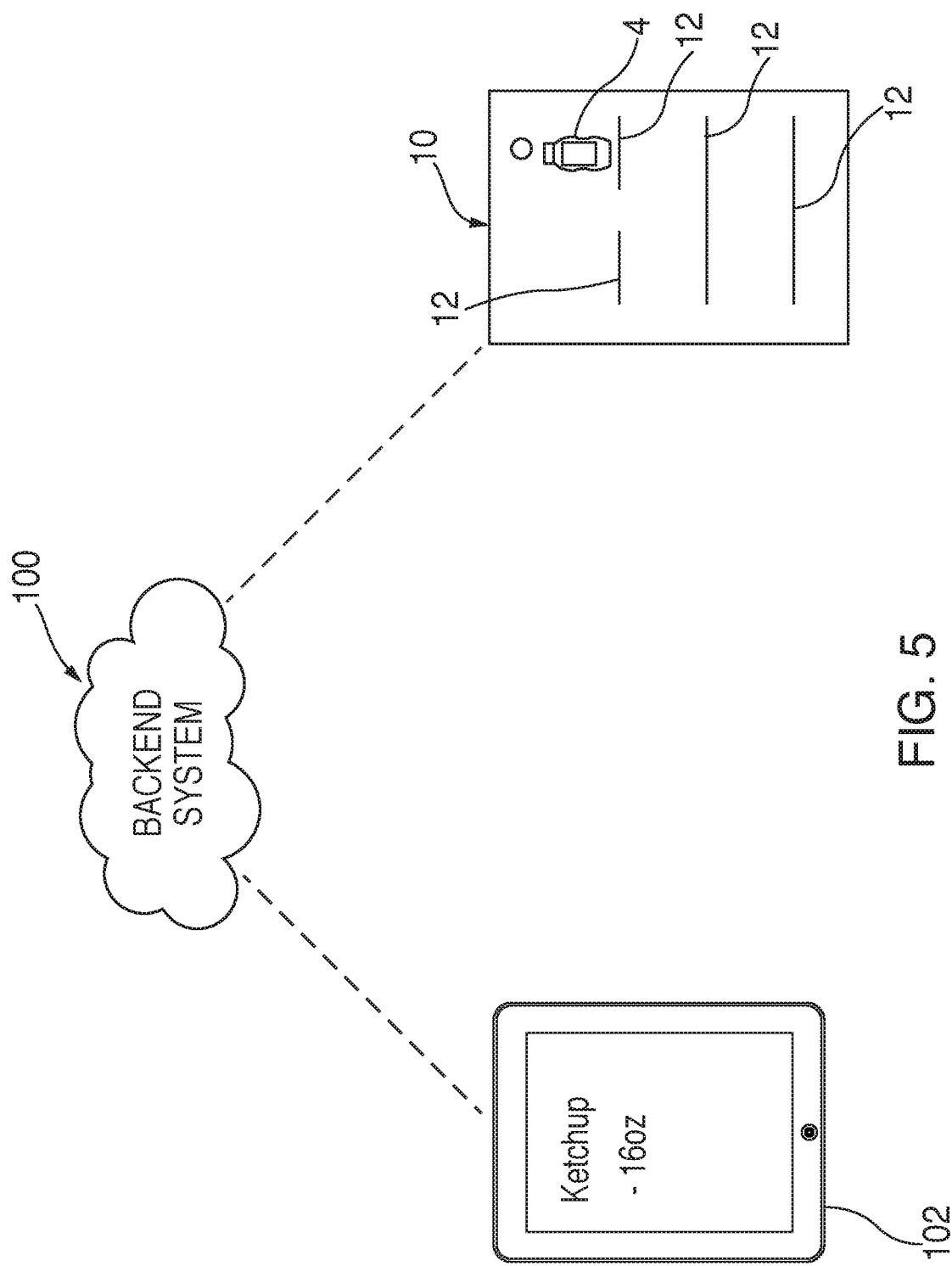
FIG. 5 is an illustrative diagram for providing an individual with remote access to inventory status information in accordance, with various embodiments.

FIG. 5 is an illustrative diagram for providing an individual with remote access to inventory status information in accordance, with various embodiments. Backend system 100, in some embodiments, may be configured to provide a status report of some or all of the known physical items located within storage unit 10 to an individual via a user device 102. User device 102 may be any type of electronic device such as, without limitation, a mobile phone, a tablet, a laptop computer, etc. (the information could even obtained remotely via a desktop computer for the convenience of the individual). In some embodiments, an individual may access a device profile of storage unit 10 using user device 102. For example, user device 102 may be capable of receiving a device profile of storage unit 10 from backend system 100, as well as a separate inventory management system. In response to a request for information related to a particular physical item, backend system 100 may provide, for example, a physical item's name, current weight, percentage used, or any other suitable information associated with one or more physical items of storage unit 10, to user device 102, which may display the requested information on a display screen of user device 102, or on an additional display screen.

Backend system 100, in some embodiments, may also be configured to provide notification information to user device 102 regarding one or more physical items stored by storage unit 10. For instance, backend system 100 may send a notification to user device 102 indicating that a current supply of physical item 4 is low, as well as inquiring whether a replacement physical item for physical item 4 should be reordered. In some embodiments, backend system 100 may provide a user with a suggested shopping list based on a current status of the inventory within storage unit 10. For instance, backend system 100 may determine, based on each physical item profile 14 of storage unit 10, which physical items are currently below a particular supply threshold or thresholds, and may produce a list of these physical items for the user. Once the list has been determined, backend system 100 may generate display data representing the list, which may be sent to user device 102 via any of the network connections previously described so that the user may be able to purchase those physical items (either in-person, such as at a market, or via a fulfillment service). In some embodiments, backend system 100 may generate audio data representing the list for being output by storage unit 10 and/or user device 102. For example, backend system 100 may generate text data representing the list, and then may perform text-to-speech processing to generate audio data representing the text data, such as an MP3 file that can be played via speakers on user device 102.

Figure 6:
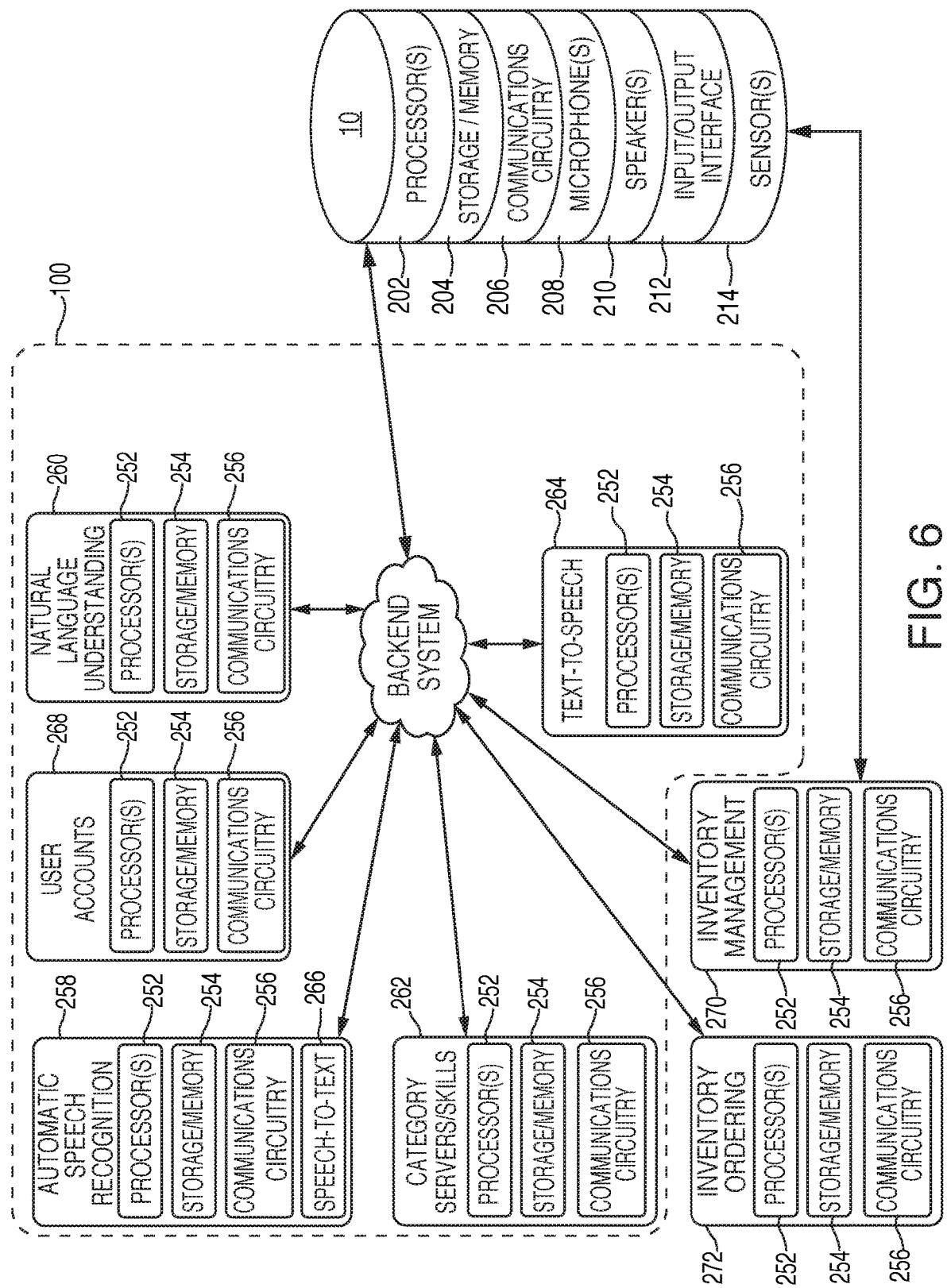
FIG. 6 is an illustrative diagram of the architecture of the system of FIGS. 1-5, in accordance with various embodiments.

FIG. 6 is an illustrative diagram of the architecture of the system of FIGS. 1-5, in accordance with various embodiments. Storage unit 10 may include one or more processors 202, storage/memory 204, communications circuitry 206, one or more microphones 208 or other audio input devices (e.g., transducers), one or more speakers 210 or other audio output devices, an optional input/output ("I/O") interface 212, and sensors 214. However, one or more additional components may be included within storage unit 10, and/or one or more components may be omitted. For example, storage unit 10 may include a power supply or a bus connector. As another example, storage unit 10 may not include an I/O interface. Furthermore, while multiple instances of one or more components may be included within storage unit 10, for simplicity only one of each component has been shown.

Processor(s) 202 may include any suitable processing circuitry capable of controlling operations and functionality of storage unit 10, as well as facilitating communications between various components within storage unit 10. In some embodiments, processor(s) 202 may include a central processing unit ("CPU"), a graphic processing unit ("GPU"), one or more microprocessors, a digital signal processor, or any other type of processor, or any combination thereof. In some embodiments, the functionality of processor(s) 202 may be performed by one or more hardware logic components including, but not limited to, field-programmable gate arrays ("FPGA"), application specific integrated circuits ("ASICs"), application-specific standard products ("AS SPs"), system-on-chip systems ("SOCs"), and/or complex programmable logic devices ("CPLDs"). Furthermore, each of processor(s) 202 may include its own local memory, which may store program modules, program data, and/or one or more operating systems. However, processor(s) 202 may run an operating system ("OS") for storage unit 10, and/or one or more firmware applications, media applications, and/or applications resident thereon.

Storage/memory 204 may include one or more types of storage mediums such as any volatile or non-volatile memory, or any removable or non-removable memory implemented in any suitable manner to store data on storage unit 10. For example, information may be stored using computer-readable instructions, data structures, and/or program modules. Various types of storage/memory may include, but are not limited to, hard drives, solid state drives, flash memory, permanent memory (e.g., ROM), electronically erasable programmable read-only memory ("EEPROM"), CD-ROM, digital versatile disk ("DVD") or other optical storage medium, magnetic cassettes, magnetic tape, magnetic disk storage or other magnetic storage devices, RAID storage systems, or any other storage type, or any combination thereof. Furthermore, storage/memory 204 may be implemented as computer-readable storage media ("CRSM"), which may be any available physical media accessible by processor(s) 202 to execute one or more instructions stored within storage/memory 204. In some embodiments, one or more applications (e.g., gaming, music, video, calendars, lists, etc.) may be run by processor(s) 202, and may be stored in memory 204.

Communications circuitry 206 may include any circuitry allowing or enabling storage unit 10 to communicate with one or more devices, servers, and/or systems. For example, communications circuitry 206 may facilitate communications between storage unit 10 and backend system 100. Communications circuitry 206 may use any communications protocol, such as any of the previously mentioned exemplary communications protocols. In some embodiments, storage unit 10 may include an antenna to facilitate wireless communications with a network using various wireless technologies (e.g., Wi-Fi, Bluetooth®, radiofrequency, etc.). In yet another embodiment, storage unit 10 may include one or more universal serial bus ("USB") ports, one or more Ethernet or broadband ports, and/or any other type of hardwire access port so that communications circuitry 206 allows storage unit 10 to communicate with one or more communications networks.

Storage unit 10 may also include one or more microphones 208 and/or transducers. Microphone(s) 208 may be any suitable component capable of detecting audio signals. For example, microphone(s) 208 may include one or more sensors for generating electrical signals and circuitry capable of processing the generated electrical signals. In some embodiments, microphone(s) 208 may include multiple microphones capable of detecting various frequency levels. As an illustrative example, storage unit 10 may include multiple microphones (e.g., four, seven, ten, etc.) placed at various positions about storage unit 10 to monitor/capture any audio outputted in the environment where storage unit 10 is located. The various microphones 208 may include some microphones optimized for distant sounds, while some microphones may be optimized for sounds occurring within a close range of storage unit 10.

Storage unit 10 may further include one or more speakers 210. Speaker(s) 210 may correspond to any suitable mechanism for outputting audio signals. For example, speaker(s) 210 may include one or more speaker units, transducers, arrays of speakers, and/or arrays of transducers that may be capable of broadcasting audio signals and or audio content to a surrounding area where storage unit 10 may be located.

In some embodiments, storage unit 10 may be hard-wired, or wirelessly connected, to one or more speakers 210. For example, storage unit 10 may cause one or more speakers 210 to output audio thereon. In this particular scenario, storage unit 10 may receive audio to be output by speakers 210, and storage unit 10 may send the audio to speakers 210 using one or more communications protocols. For instance, storage unit 10 and speaker(s) 210 may communicate with one another using a Bluetooth® connection, or another near-field communications protocol. In some embodiments, storage unit 10 may communicate with speaker(s) 210 indirectly. For example, storage unit 10 may communicate with backend system 100, and backend system 100 may communicate with speaker(s) 210. In this particular example, storage unit 10 may send audio data representing a command to play audio using speaker(s) 210 to backend system 100, and backend system 100 may send the audio to speaker(s) 210 such that speaker(s)210 may play the audio thereon.

In some embodiments, one or more microphones 208 may serve as input devices to receive audio inputs, such as speech from individual 2. Storage unit 10, in the previously mentioned embodiment, may then also include one or more speakers 210 to output audible responses. In this manner, storage unit 10 may function solely through speech or audio, without the use or need for any input mechanisms or displays.

In some exemplary embodiments, storage unit 10 includes I/O interface 212. The input portion of I/O interface 212 may correspond to any suitable mechanism for receiving inputs from a user of storage unit 10. For example, a camera, keyboard, mouse, joystick, or external controller may be used as an input mechanism for I/O interface 212. The output portion of I/O interface 212 may correspond to any suitable mechanism for generating outputs from storage unit 10. For example, one or more displays may be used as an output mechanism for I/O interface 212. As another example, one or more lights, light emitting diodes ("LEDs"), or other visual indicator(s) may be used to output signals via I/O interface 212 of storage unit 10. In some embodiments, one or more vibrating mechanisms or other haptic features may be included with I/O interface 212 to provide a haptic response to individual 2 from storage unit 10. Persons of ordinary skill in the art will recognize that, in some embodiments, one or more features of I/O interface 212 may be included in a purely voice activated version of storage unit 10. For example, one or more LED lights may be included on storage unit 10 such that, when microphone(s) 208 receive audio from individual 2, the one or more LED lights become illuminated signifying that audio has been received by storage unit 10. In some embodiments, I/O interface 212 may include a display screen and/or touch screen, which may be any size and/or shape and may be located at any portion of storage unit 10. Various types of displays may include, but are not limited to, liquid crystal displays ("LCD"), monochrome displays, color graphics adapter ("CGA") displays, enhanced graphics adapter ("EGA") displays, variable graphics array ("VGA") display, or any other type of display, or any combination thereof. Still further, a touch screen may, in some embodiments, correspond to a display screen including capacitive sensing panels capable of recognizing touch inputs thereon.

Storage unit 10 may further include one or more sensors 214. Sensors 214 may correspond to any suitable type of sensor capable of determining a weight and/or location of physical items placed in storage unit 10, such as on shelves 12. In some exemplary embodiments, sensors 214 may be arranged in grids on shelves 12 of storage unit 10. For example, sensors 214 may be arranged in a two-dimensional grid. When a physical item is placed on one of shelves 12, an amount of force being applied to one or more of sensors 214 may be determined, for instance using processors 202. For example, a weight of an object may be equal to a mass of the object multiplied by the gravitational constant associated with a particular geographical location where sensor(s) 214 are located. The weight, in other words, may correspond to an amount of force being applied to a particular sensor, or sensors, by an object's mass. Thus, storage unit 10 may be capable of determining a weight of an object being placed on, or about, sensor(s) 214, based on a determined amount of force being applied to sensor(s) 214.

Each sensor 214 may be associated with a particular location for storage unit 10, such that the location of a physical item may be determined based on which one or more sensors 214 sense the weight of the physical item. For example, sensors 214, as mentioned previously, may be included within one or more of shelves 12. Each of shelves 12 may have an associated position within storage unit 10 such that, if a particular sensor, or sensors 214, are determined to have a force being applied to them, then that may correspond to a physical item being located at an associated location within storage unit 10. As an illustrative example, a first sensor 214 may be located on a top left shelf 12 of storage unit 10, and further, at a center of shelf 12. If first sensor 214 determines that a first weight has been applied thereto, this may indicate that a physical item has been placed at the center of top left shelf 12 of storage unit 10.

Sensors 214 may correspond to any suitable type of sensor such as, but not limited to, a force sensor, a load cell, a piezocapacitive sensor, a piezoelectric sensor, a pressure sensor, a torque sensor, a heat sensor, a light sensor, or any other sensor, or any combination thereof. As an illustrative example, sensors 214 may correspond to a piezoelectric sensor, capable of measuring an amount of force or pressure being applied based on an electrical charge. Generally, an amount of force being applied to the sensor is proportional to a source voltage, such that a change in the amount of force applied proportionally changes the source voltage. Persons of ordinary skill in the art will recognize, however, that the aforementioned is merely exemplary, and any suitable sensor system may be used.

Backend system 100, as mentioned previously, may, in some embodiments, be in communication with storage unit 10, as well as one or more additional devices and/or systems. Backend system 100 includes various components and modules including, but not limited to, automatic speech recognition ("ASR") module 258, natural language understanding ("NLU") module 260, skills module 262, text-to-speech ("TTS") module 264, and user accounts module 268. A speech-to-text ("STT") module may be included in the ASR module 258. In some embodiments, backend system 100 may also include computer readable media, including, but not limited to, flash memory, random access memory ("RAM"), and/or read-only memory ("ROM"). Backend system 100 may also include various modules that store software, hardware, logic, instructions, and/or commands for backend system 100, such as, a speaker identification ("ID") module, a user profile module, or any other module, or any combination thereof.

ASR module 258 may be configured such that it recognizes human speech in detected audio, such as audio captured by storage unit 10. ASR module 258 may include, in one embodiment, one or more processor(s) 252, storage/memory 254, and communications circuitry 256. Processor(s) 252, storage/memory 254, and communications circuitry 256 may, in some embodiments, be substantially similar to processor(s) 202, storage/memory 204, and communications circuitry 206, which are described in greater detail above, and the aforementioned descriptions of the latter may apply. Furthermore, in some embodiments, ASR module 258 may include speech-to-text ("STT") module 266. STT module 266 may employ various speech-to-text techniques. However, techniques for transcribing speech into text are well known in the art and need not be described in further detail herein, and any suitable computer implemented speech to text technique may be used to convert the received audio signal(s) into text, such as SOFTSOUND speech processing technologies available from the Autonomy Corporation, which is headquartered in Cambridge, England, United Kingdom. Furthermore, ASR module 258 may, in some embodiments, be capable of leveraging personalized data about an individual, such as using a user account stored within user accounts module 262. For example, if an individual had just bought a particular physical item, such as ketchup, then a likelihood that the individual said the physical item name (e.g., "ketchup") may be weighted higher than something else that might sound like the physical item name.

ASR module 258 may include an expression detector that analyzes audio signals received by backend system 100, such as the expression detector. Such an expression detector may be implemented using keyword spotting technology, as an example. A keyword spotter is a functional component or algorithm that evaluates an audio signal to detect the presence of a predefined word or expression, such as a passphrase or other sound data, within the audio signals. Rather than producing a transcription of words of the speech, a keyword spotter generates a true/false output (e.g., a logical I/O) to indicate whether or not the predefined word or expression was represented in the audio signal. In some embodiments, an expression detector may be configured to analyze the audio signal to produce a score indicating a likelihood that the wakeword or phrase, is represented within the audio signal. The expression detector may then compare that score to a threshold value to determine whether the wakeword or phrase will be declared as having been spoken.

For instance, ASR module 258 may transcribe received audio data into text data representing the words of the speech contained in the audio data using STT module 266. The text data may then be used by other components for various purposes, such as executing system commands, inputting data, etc. ASR module 258 may then interpret an utterance based on the similarity between the utterance and pre-established language models stored in an ASR model knowledge base of storage/memory 254. For example, the input audio data may be compared with models for sounds (e.g., sub-word units or phonemes) and sequences of sounds to identify words that match the sequence of sounds spoken in the utterance of the audio data.

The different ways a spoken utterance may be interpreted (i.e., the different hypotheses) may each be assigned a probability or a confidence score representing a likelihood that a particular set of words matches those spoken in the utterance. The confidence score may be based on a number of factors including, for example, the similarity of the sound in the utterance to models for language sounds (e.g., an acoustic model), and the likelihood that a particular word which matches the sounds would be included in the sentence at the specific location (e.g., using a language or grammar model). Thus each potential textual interpretation of the spoken utterance (hypothesis) is associated with a confidence score. Based on the considered factors and the assigned confidence score, ASR module 258 may output the most likely text recognized in the audio data. ASR module 258 may also output multiple hypotheses in the form of a lattice or an N-best list with each hypothesis corresponding to a confidence score or other score (such as probability scores, etc.).

ASR module 258 may further attempts to match received feature vectors to language phonemes and words as known in acoustic models and language models stored within storage/memory 254 of ASR module 258. Recognition scores may be determined for the feature vectors based on acoustic information and language information. The acoustic information may be used to calculate an acoustic score representing a likelihood that the intended sound represented by a group of feature vectors matches a language phoneme. The language information may be used to adjust the acoustic score by considering what sounds and/or words are used in context with each other, thereby improving the likelihood that the speech recognition process will output speech results that make sense grammatically. The specific models used may be general models or may be models corresponding to a particular domain, such as music, application enablement/disablement, shopping, etc.

ASR module 258 may generate results in the form of a single textual representation of the speech, an N-best list including multiple hypotheses and respective scores, and/or lattice, for example, which may be sent to NLU module 260 for processing, such as conversion of the text into commands for execution, either by storage unit 10, backend system 100, or by another device, such as a separate device or server capable of performing one or more additional functionalities thereon (e.g., an inventory management system, a fulfillment system, etc.).

NLU module 260 may be configured such that it determines user intent based on the detected audio received from storage unit 10. NLU module 260 may include processor(s) 252, storage/memory 254, and communications circuitry 256. NLU module 260 may communicate the received command to an appropriate subject matter server, application, or skill on subject matter servers/skills module 262 to cause one or more specific functionalities to be accessible, perform one or more tasks, and/or retrieve an appropriate response or response information. NLU module 260 may include processor(s) 252, storage/memory 254, and communications circuitry 256 which, in one embodiment, may be substantially similar to processor(s) 202, storage/memory 204, and communications circuitry 206 of electronic device 200, and the previous description may apply.

NLU module 260 may identify portions of text that correspond to a named entity recognizable by NLU module 260. A downstream process called named entity resolution may be configured to link a portion of text to an actual specific known entity. To perform named entity resolution, the system may utilize gazetteer information stored in an entity library storage. The gazetteer information may be used for entity resolution, for example matching ASR results with different entities (such as song titles, contact names, etc.). Gazetteers may be linked to a user account or profile of users accounts module 268, certain domains (e.g., music or shopping), or may be organized in a variety of other ways.

Generally, NLU module 260 takes textual input and attempts to make a semantic interpretation of the text. That is, NLU module 260 may be configured to determine a meaning of text based on the individual words and then implements that meaning. In some embodiments, NLU module 260 may interpret a text string to derive an intent or a desired action of the utterance (e.g., utterance 4) as well as the pertinent pieces of information in the text that allow an action to be completed. For example, if a spoken utterance is processed by ASR module 258 and outputs the text, "call mom," NLU module 260 may determine that an intent of the utterance is to activate a telephone, or telephone functionality, and to initiate a call with a contact matching the entity "mom". In some embodiments, NLU module 260 may process several textual inputs related to the same utterance. For example, if ASR module 258 outputs N text segments (as part of an N-best list), then NLU module 260 may process all N outputs.

NLU module 260 may be configured to parse and tag annotate text. For example, for the text "call mom," "call" may be tagged as a command (e.g., a command to execute a phone call), and "mom" may be tagged as a specific entity and target of the command (e.g., a telephone number for the entity corresponding to "mom" stored in a contact list). Further, NLU module 260 may be used to provide answer data in response to queries, for example using a knowledge base stored within storage/memory 254 of NLU module 260 and/or storage/memory of backend system 100.

To correctly perform natural language understanding processing of speech input, NLU module 260 may be configured to determine a "domain" of an utterance. By determining the domain, NLU module 260 may narrow down which services and functionalities offered by an endpoint device (e.g., storage unit 10, backend system 100, or any other electronic device or system) may be relevant.

Category servers/skills module 262 may, for example, correspond to various action specific skills or servers capable of processing various task specific actions. Category servers/skills module 262 may further correspond to first party applications and/or third party applications operable to perform different tasks or actions. For example, based on the context of audio received from storage unit 10, backend system 100 may use a certain application or skill to retrieve or generate a response, which in turn may be communicated back to storage unit 10. In some embodiments, category servers/skills module 262 may include an inventory management system or module capable of monitoring, analyzing, and storing information related to one or more physical items stored by storage unit 10. Furthermore, category servers/skills module 262 may further include one or more fulfillment applications, capable of communicating with various fulfillment services, which may be used for ordering replacement physical items and/or purchasing physical items. Category servers/skills module 262 may include processor(s) 252, storage/memory 254, and communications circuitry 256. As an illustrative example, Category servers/skills module 262 may correspond to one or more inventory management servers for storing and processing information related to physical items stored in storage unit 10.

TTS module 264 may employ various text-to-speech techniques. Techniques for transcribing speech into text are well known in the art and need not be described in further detail herein, any suitable computer implemented speech to text technique may be used to convert the received audio signal(s) into text, such as SOFTSOUND speech processing technologies available from the Autonomy Corporation, which is headquartered in Cambridge, England, United Kingdom. TTS module 264 may also include processor(s) 252, storage/memory 254, and communications circuitry 256.

User accounts module 268 may store one or more user profiles corresponding to users having a registered account on backend system 100. For example, a parent may have a registered account on backend system 100, and each of the parent's children may have their own user profile registered under the parent's registered account. Information, settings, and/or preferences, for example, for each user profile may be stored within a user profile database. In some embodiments, user accounts module 268 may store a voice signal, such as voice biometric information, for a specific user profile. This may allow speaker identification techniques to be used to match a voice to voice biometric data associated with a specific user profile. In some embodiments, user accounts module 268 may store a telephone number assigned to a particular user profile. In some embodiments, a user profile may be associated with a particular device, such as storage unit 10, and may indicate various properties, characteristics, and/or information associated with one or more physical items stored by storage unit 10. For example, a weight, location, item type, name, and the like, stored by storage unit 10 may be included within a particular user profile.

Persons of ordinary skill in the art will recognize that although each of ASR module 258, NLU module 260, Category servers/skills module 262, TTS module 264, and user accounts module 268 include instances of processor(s) 252, storage/memory 254, and communications circuitry 256, those instances of processor(s) 252, storage/memory 254, and communications circuitry 256 within each of ASR module 258, NLU module 260, Category servers/skills module 262, TTS module 264, and user accounts module 268 may differ. For example, the structure, function, and style of processor(s) 252 within ASR module 258 may be substantially similar to the structure, function, and style of processor(s) 252 within NLU module 260, however the actual processor(s) 252 need not be the same entity.

Backend system 100 and/or storage unit 10 may also be in communication with inventory management system 270 and inventory ordering system 272. Inventory management system 270 may store profiles, such as profile 14, associated with storage unit 10, as well as device profiles for various storage devices, such as storage unit 10. Inventory management system 270 may also include applications and/or routines that facilitate tracking the physical items located within storage unit 10. Inventory management system 270 may communicate with other modules of backend system 100, such as ASR module 258, NLU module 260, category servers 262, and user accounts module 268. For example, when individual 2 speaks an utterance requesting a location of physical item 4, backend system 100 may receive audio data representing the utterance, and, using ASR module 258, may generate text data representing the audio data. NLU module 260 may then determine an intent of the utterance, and may send a request for location information associated with physical item 4 to inventory management system 270. In response, inventory management system 270 may send, to backend system 100, a current location of physical item 4 (e.g., a particular location within storage unit 10, or a particular sensor or sensors associated with physical item 4), and backend system 100 may generate audio data of a response to be output to individual 2 regarding the current location of physical item 4. Alternatively, inventory management system 270 may send text data representing a response message indicating a current location of physical item 4 to backend system 100, which in turn may generate audio data representing the text data, and may send the audio data to storage unit 10 to be output by speaker(s) 210.

In some embodiments, backend system 100 and/or storage unit 10 may send sensor data, a device identifier of storage unit 10, a user account associated with a device identifier for storage unit 10, physical item information identifying the name of the physical item, text data representing an intent, and/or a location request of the physical item, to inventory management system 270. Inventory management system 270 may then determine a corresponding device profile or physical item profile (e.g., profile 14) stored thereon associated with storage unit 10 and/or physical item 4, and may determine the location of the physical item from profile 14 associated with physical item 4. In some embodiments, inventory management system 270 may generate text data identifying the location of the physical item and provide the text data to TTS module 264 to generate audio data to be sent to storage unit 10. In some embodiments, inventory management system 270 may generate text data requesting a follow-up message, such as a confirmation request (e.g., a request for confirmation of a name of a physical item) and provide such text data to backend system 100 for generating audio data to be sent to storage unit 10. For example, if inventory management system 270 cannot identify a profile associated with a particular physical item, inventory management system 270 may generate text data requesting a confirmation message requesting the user to identify a particular physical item (e.g., "What is the name of the physical item you are looking for?"). Inventory management system 270 may also include processor(s) 252, storage/memory 254, and communications circuitry 256.

Inventory ordering module 272 may include routines and/or applications to facilitate ordering of physical items. For example, inventory ordering module 272 may be part of a supplier ordering system or fulfillment system capable of fulfilling orders for physical items made by an individual, or made on behalf of an individual, such via a user device, user account setting, or the like. Inventory management system 270 may provide inventory ordering module 272 a name or other identification information (e.g., a serial number) to place an order for the physical item. Inventory management system 270 may also obtain customer information (e.g., shipping information, payment information, etc.) from user accounts module 268 and provide it to inventory ordering module 272. Inventory ordering module 272 may also include processor(s) 252, storage/memory 254, and communications circuitry 256.

Inventory management system 270 and inventory ordering module 272 may be separate from the other modules of backend system 100. It will be appreciated, though, that one or both of inventory management system 270 and inventory ordering module 272 may also be incorporated into backend system 100, a separate user device (e.g., user device 102), and/or storage unit 10.

Figure 7:
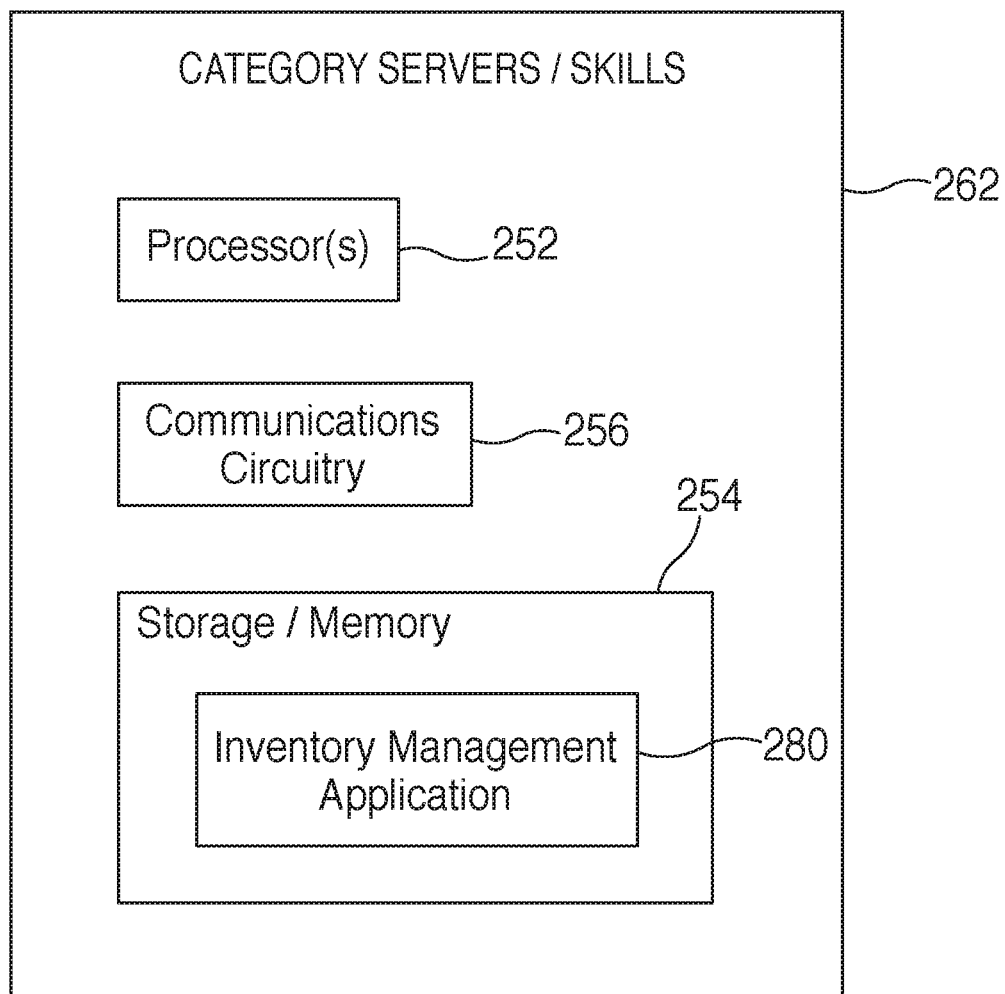
FIG. 7 is an illustrative diagram of a category servers/skills module including an inventory management system, in accordance with various embodiments.

FIG. 7 is an illustrative diagram of a category servers/skills module including an inventory management system, in accordance with various embodiments. In some embodiments, skills module 262 may include an inventory management application 280. Inventory management application 280 may include various functionalities that provide inventory management processing such as, for example and without limitation, generating physical item profiles corresponding to physical items stored in storage unit 10, generating device profiles associated devices (e.g., storage unit 10), updating profiles corresponding to physical items stored in storage unit 10, and other functions associated with managing the inventory of storage unit 10. For example, inventory management application 280 may include one or more servers for storing profiles (e.g., profiles 14) associated with various physical items (e.g., physical item 4) stored by storage unit 10. In some embodiments, inventory management application 280 may be provided in addition to inventory management system 270 and inventory management functionality may be split between inventory management system 270 and inventory management application 280. It will also be appreciated that inventory management skill module 268 may be omitted without departing from the scope of the disclosed concept.

In some embodiments, inventory management module 280 may facilitate communications with one or more of inventory management system 280 and inventory ordering module 272. For instance, in response to receiving an utterance, inventory management application 280 may be used to communicate a request determined from the utterance to inventory management system 270. As an illustrative example, if the utterance is, "Alexa—Where is the ketchup?", a request for a location within a device associated with a device identifier of storage unit 10 for a physical item having a name, "ketchup," may be sent to inventory management system 270 using inventory management application 280.

Figure 8:
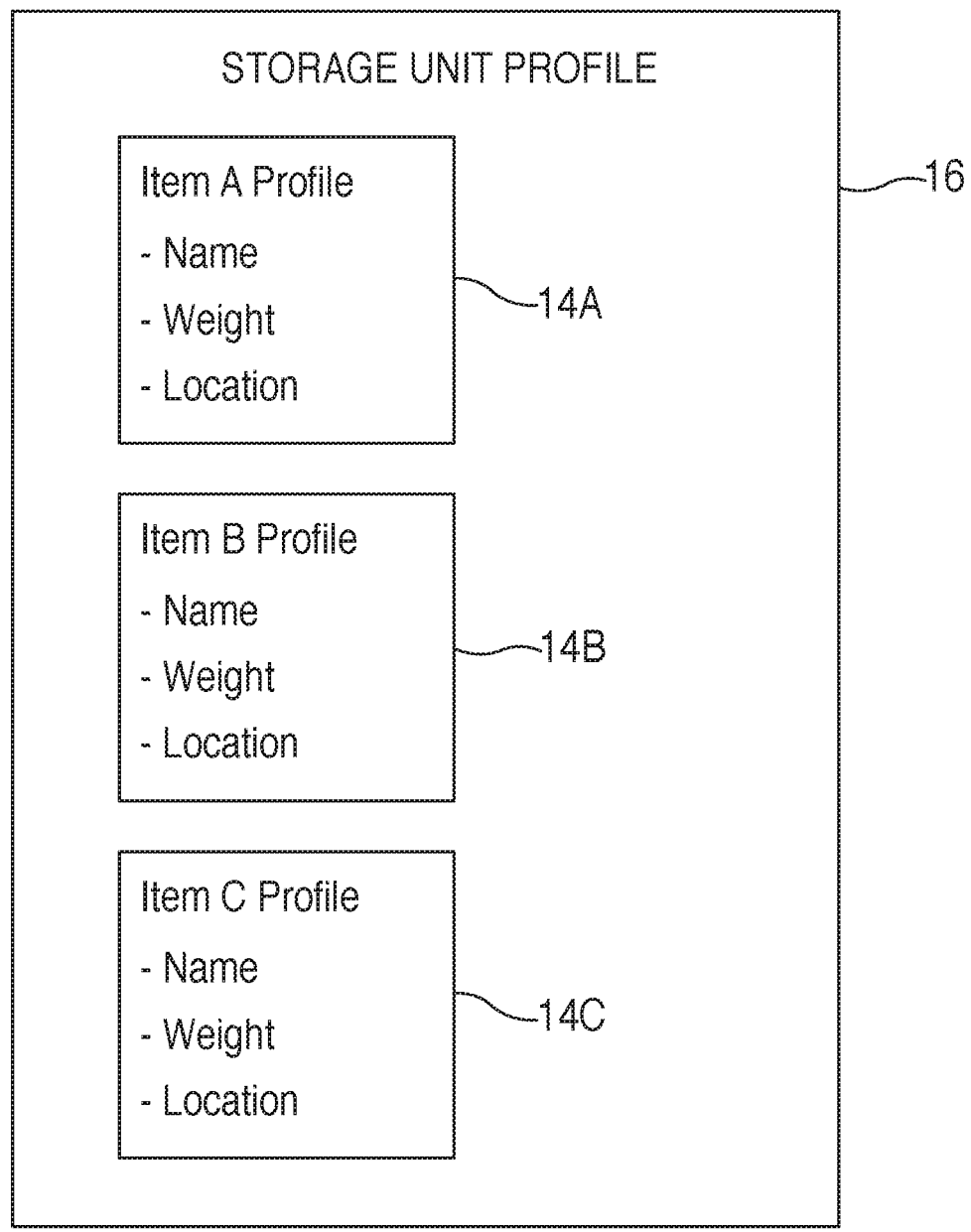
FIG. 8 is an illustrative diagram of a storage unit profile, in accordance with various embodiments.

FIG. 8 is an illustrative diagram of how a storage unit profile may be created and maintained in accordance with various embodiments. In addition to generating and updating physical item profile 14 as previously described, backend system 100 may additionally generate a storage unit profile 16 for storage unit 10. Storage unit profile 16 may include individual profiles 14A-C corresponding to various physical items stored in storage unit 10. In the illustrative embodiment, storage unit profile 16 may include three profiles 14A-C, corresponding to items A, B, and C, respectively. Item A, for example, might be milk and profile 14A may include information for this product. For instance, profile 14A may indicate that a type of physical item (e.g., skim milk), an item size (e.g., half gallon), an item weight (e.g., weight X pounds full), and an item location within storage unit 10 (e.g., top left shelf toward the front). Item B, on the other hand, might be orange juice and profile 14B may include information for this product. For example, profile 14B may indicate a type of physical item (e.g., "no pulp" juice), an item size (e.g., half gallon), an item weight (e.g., weighs Y pounds), and an item location within storage unit 10 (e.g., bottom right shelf toward the front). Still further, item C, for example, might be another physical item stored within storage unit 10, and profile 14C may include information for item C.

Figure 9:
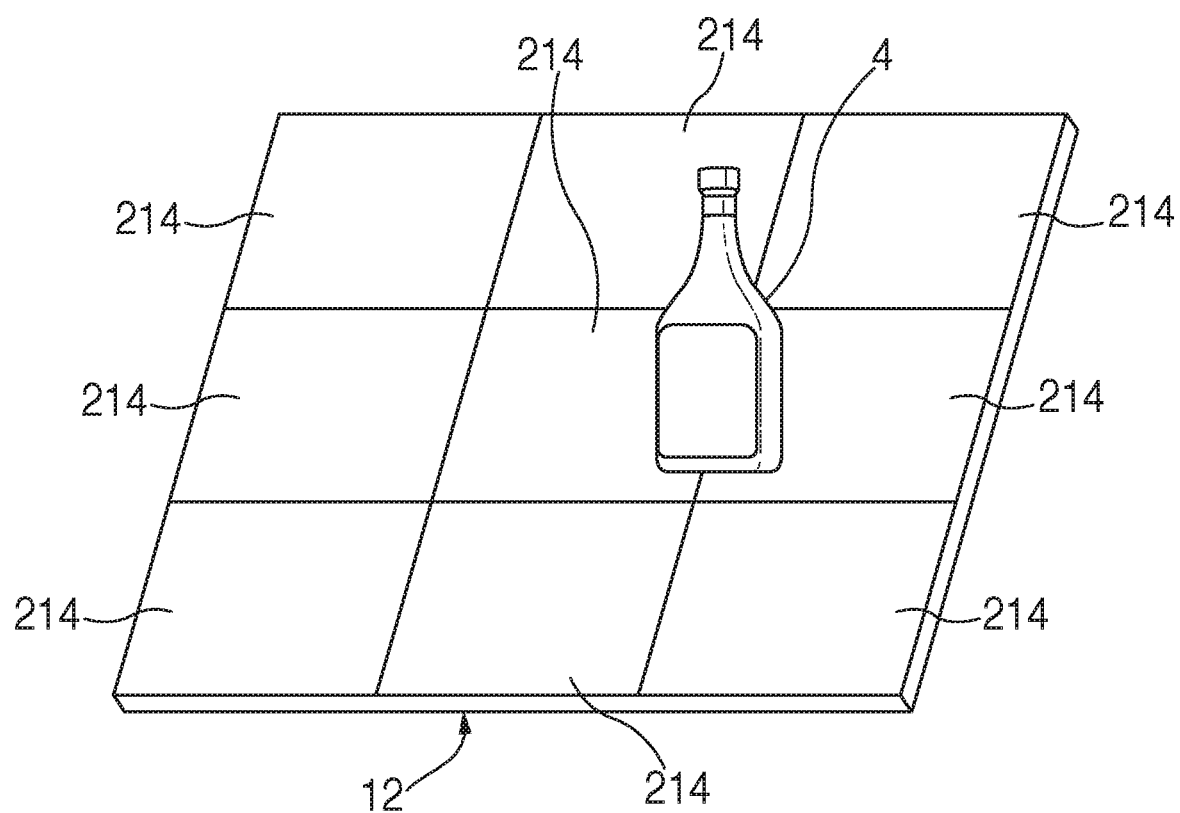
FIG. 9 is an illustrative diagram of a shelf including sensors, in accordance with various embodiments.

FIG. 9 is an illustrative diagram of a shelf including sensors, in accordance with various embodiments. Shelf 12, in one exemplary, non-limiting embodiment, may include sensors 214 that may be configured to determine a weight of one or more physical items, such as physical item 4, placed on shelf 12. In one embodiment, sensors 214 may be arranged in a grid-type pattern on shelf 12. For instance, in the illustrative embodiment, shelf 12 may include nine sensors 214 arranged in a three sensor by three sensor grid. However, it will be appreciated by those having ordinary skill in the art that any number of sensors 214 may be used on shelf 12, and sensors 214 may be arranged in any suitable manner. For example, shelf 12 may include more than or less than nine sensors 214.

Sensors 214 may be any sensors capable of determining an amount of force being applied by a physical item thereto. For example, sensors 214 may be capable of determining a weight of a physical item stored on shelf 12. Sensors 214 may be any suitable types of sensor, such as, and without limitation, load sensors, strain gauges, pressure transducers, load cells, etc. Backend system 100 may recognize that individual objects may be placed within storage unit 10 such that they are within the range of affecting multiple sensors 214 instead of a single sensor. Backend system may take the inputs from multiple sensors in order to accurately determine a weight of each physical item 4 placed therein. For instance, as seen in FIG. 9, physical item 4 may be located on shelf 12 such that a portion of physical item 4 resides on some of two different sensors 214. Backend system 100 may also estimate a size (e.g., a "footprint") of physical item 4 based on a number of sensors 214 that physical item 4 resides on. For example, backend system 100 may determine that a physical item that spans four sensors 214 is larger than a physical item that only spans two sensors 214. However, this may correspond to one physical item having a larger footprint, whereas a weight, width, and/or height of either physical item may differ. Although sensors 214 illustrated in FIG. 9 are relatively large compared to physical item 4, in some embodiments, a much larger number of smaller sensors may be arranged on shelf 12. A larger number of smaller sensors may allow for a more accurate estimation of the size of physical item 4 which, in turn, may allow backend system 100 to identify a location, weight, and/or size of physical item 4 with a higher confidence factor, for instance, when physical item 4 is removed from and/or placed back in storage unit 10.

Figure 10:
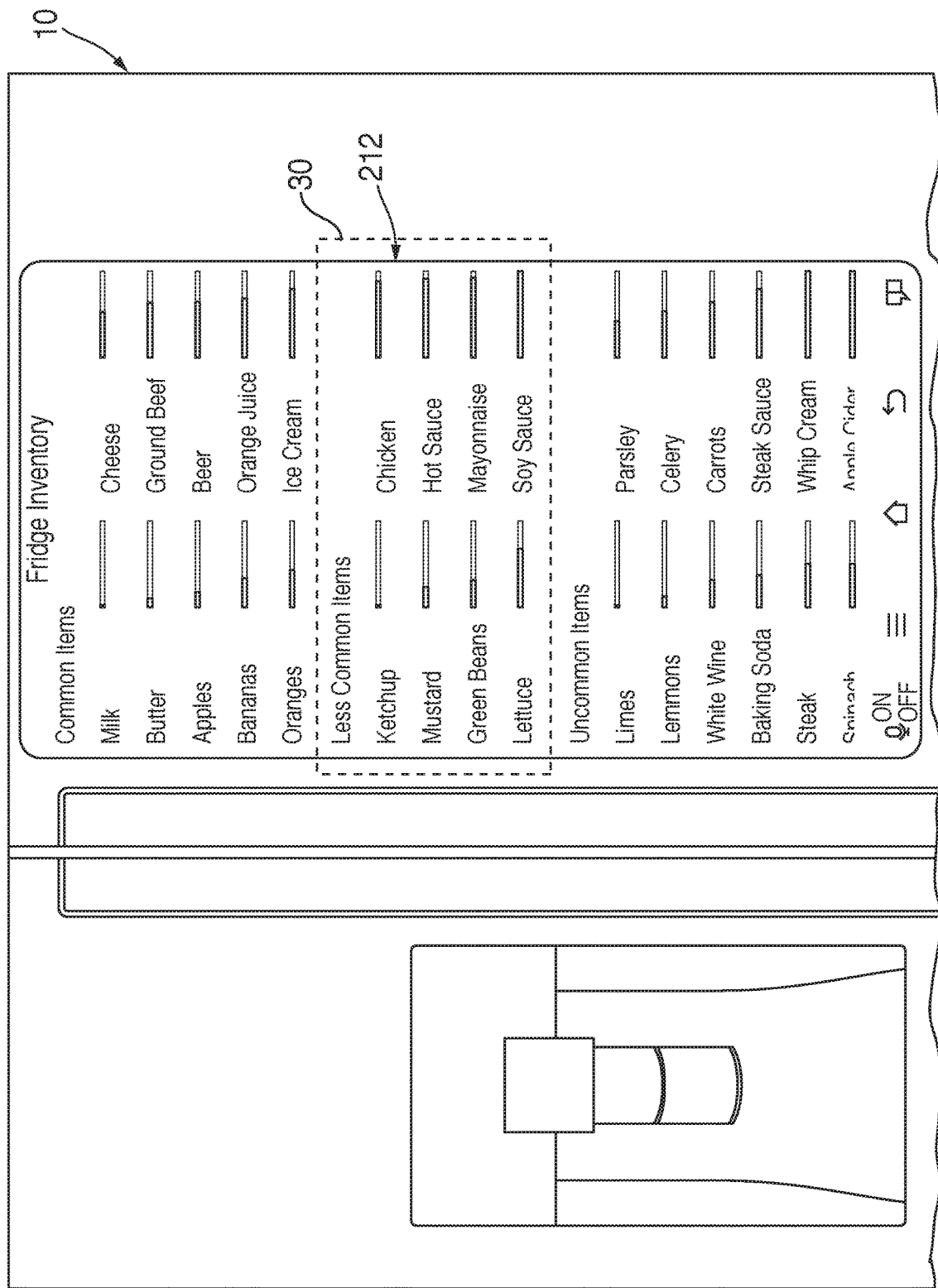
FIG. 10 is an illustrative diagram of a storage unit including a display, in accordance with various embodiments.
Figure 11:
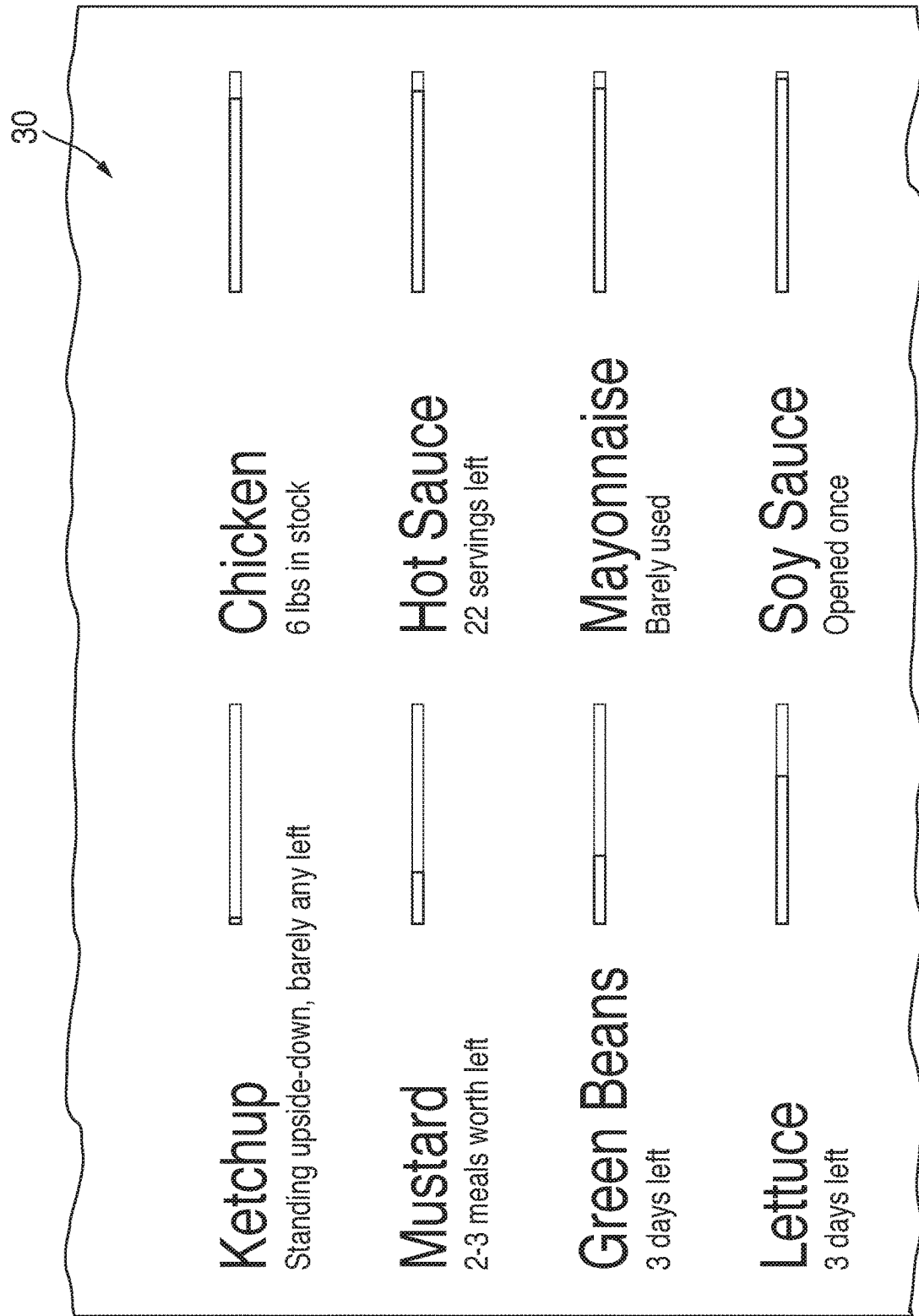
FIG. 11 is an illustrative diagram of a portion of the display of FIG. 10, in accordance with various embodiments.
Figure 12:
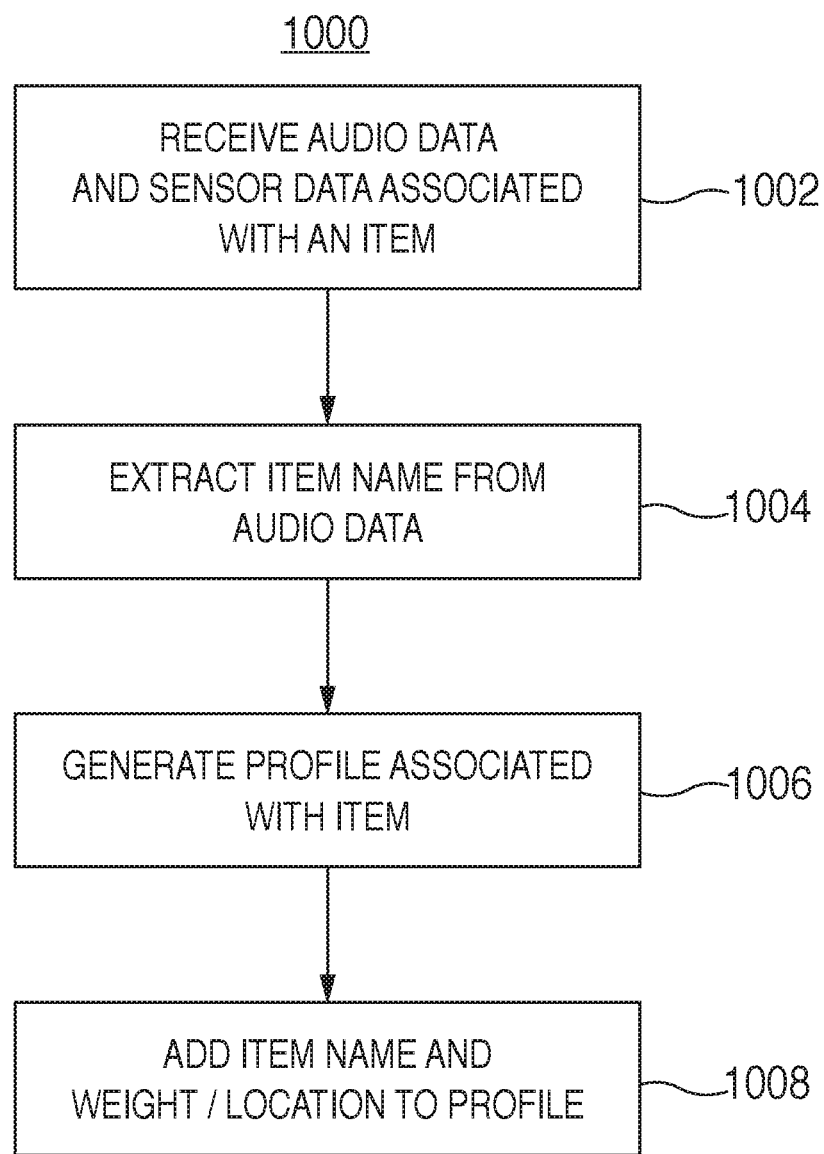
FIG. 12 is an illustrative flowchart of a process for generating a profile corresponding to a physical item, in accordance with various embodiments.

FIG. 10 is an illustrative diagram of a storage unit including a display, in accordance with various embodiments. FIG. 11 is an illustrative diagram of a portion of the display of FIG. 10, in accordance with various embodiments. As previously described, storage unit 10 may include input/output interface 212 that correspond to a display. For instance, I/O interface 212 may be a touch sensitive display screen, capable of displaying content and receiving touch inputs. In one embodiment, display I/O interface 212 may show various physical items stored by storage unit 10, as well as additional information associated with those physical items. For example, for each physical item presented on interface 212, a name of that physical item, as well as a current amount remaining of each physical item, may be included within that physical item's display portion. Alternatively, some or all of the same information shown on interface 212 may be provided in a substantially same format on user device 102, such that an individual may use user device 102 for various tasks, such as shopping for replacement physical items. Displayed interface 212 may include generic names of the physical items stored by storage unit 10, as well as graphical bars indicating an amount of each physical item that remains. The bars may include graphical information, such as color ranges, percentages, and/or words (e.g., "Full," "Empty," etc.), to further provide the individual with more detailed information regarding each physical item's current status. For instance, a product weighing seventy-five percent or more of its initial weight may be displayed using a green bar, whereas a product weight less than seventy-five percent, but more than twenty-five percent, of its initial weight may be displayed using a yellow bar, and a product weighing less than twenty-five percent of its initial weight may be displayed using a red bar.

In some embodiments, interface 212 may further group various physical items into categories based on any particular criteria, such as usage, type of product, etc. For example, frequently used physical items may be grouped together as "Common Items," including such physical items as Milk, Butter, Cheese, etc. As another example, less commonly used physical items may also be grouped together, and uncommon physical items may be grouped together as well. Still further, physical items may be grouped based on their physical item type. For instance, diary physical items may be grouped together, meats may be grouped together, drinks may be grouped together, etc. As an illustrative example, group 30—"Less Common Items" may present information regarding physical items that have been used less than a certain number of times (e.g., less than five times in one week) but more than another amount (e.g., greater than once a week).

As shown in FIG. 11, group 30 may be displayed to show an amount of each physical item of this group that may be remaining. For example, status bars may be used to show how much of a physical item has been used thus far. Alternatively, instead of showing how much of the physical item is remaining, a number of servings of a physical item may be displayed. In some embodiments, a predetermined weight of a serving of a physical item may be stored in the profile associated with the physical item. Backend system 100 may determine the amount of servings of the physical item based on the weight of the physical item and the predetermined weight of a serving. Backend system 100 may then send the number of servings of the physical item left to storage unit 10 to be displayed. Backend system 100 may access, via category skills/server 262, standard information about a majority of the products typically stored within storage unit 10. For example, backend system 100 may access industry standard information such as the exact weight for a thirty-two ounce bottle of ketchup for a particular brand without the individual user ever having to provide it. Accessing and utilizing that information in a transparent manner without having to engage the individual user should greatly improve the individual's user experience.

FIG. 11 is an illustrative diagram of a portion of the display of FIG. 10, in accordance with various embodiments. Process 1000 may be implemented, for example, by backend system 100, and may begin, in some embodiments, at step 1002. At step 1002, backend system 100 may receive audio data, as well as sensor data associated with physical item 4 from storage unit 10. The audio data may represent an utterance corresponding to user-provided name for physical item 4, while the sensor data may include a weight determined by one or more sensors of storage unit 10 and a location of physical item 10 in storage unit 10. The weight and location of physical item 4 may be determined by comparing the sensor data from just prior to physical item 4 being placed in storage unit 10 to the sensor data from just after physical item 4 was placed in storage unit 10.

At step 1004, backend system 100 may extract, or determine, the user-provided name of physical item 4 from the audio data. Backend system 100 may use, for example, automated speech recognition processing to generate text data representing the audio data, and may use natural language understanding processing to extract the user-provided name of physical item 4 from the text data. At step 1006, backend system 100 may generate profile 14 associated with physical item 4. Profile 14, in one embodiment, may be stored within storage/memory 254 for a user account associated with storage unit 10. In another embodiment, profile 14 may be generated and stored on a separate inventory management system 270. At step 1008, backend system 100 may add the user-provided physical item name, determined weight, and/or location of physical item 4 to profile 14. After profile 14 is generated, it may be updated to reflect new weights, names, and/or locations of physical item 4. Additional information (e.g., a brand of physical item 4) may also be added to profile 14.

Figure 13:
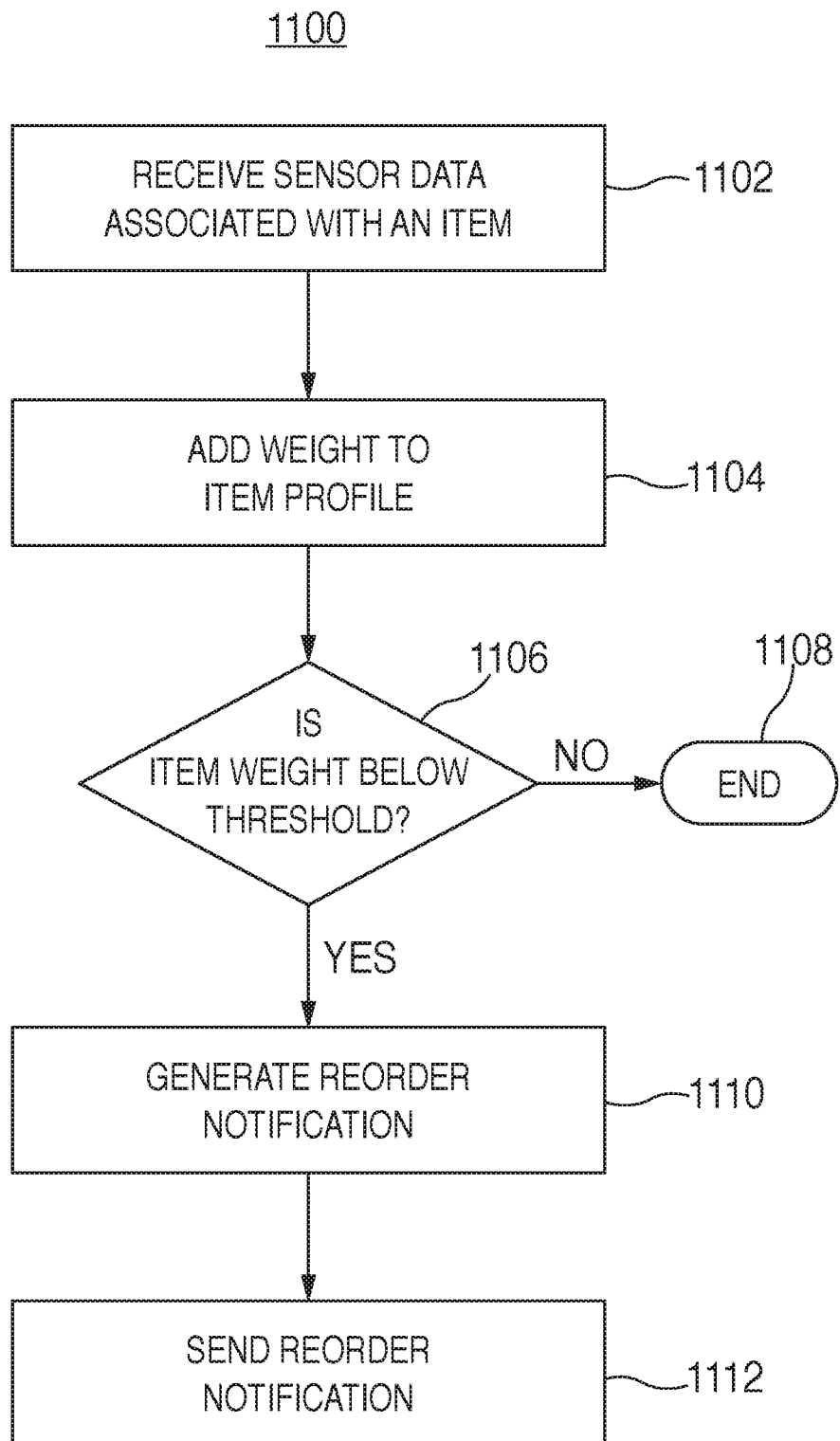
FIG. 13 is an illustrative flowchart of a process for monitoring an amount of a physical item, in accordance with various embodiments.

FIG. 13 is an illustrative flowchart of a process for monitoring an amount of a physical item, in accordance with various embodiments. Process 1100 may be implemented, for example, by backend system 100 and/or inventory management system 270, and in one embodiment, may begin at step 1102. At step 1102, backend system 100 receives sensor data associated with physical item 4, such as weight sensor data representing a first weight of physical item 4. The sensor data may be sent from storage unit 10 to backend system 100 in response to a physical item is placed in, or removed from storage unit 10. For example, in response to a door of storage unit 10 being opened, storage unit 10 may poll sensors 214, which may sensors 214 to determine an amount of force currently being applied to them. Storage unit 10 may then send sensor data representing a determined weight for a particular sensor, or sensors, to backend system 100 and/or inventory management system 272.

At step 1104, backend system 100 may add a determined weight of physical item 4 to profile 14. The weight of physical item 4 may replace a previously stored "current" weight of physical item 4 in profile 14. Profile 14, as previously described, may also include a "full" weight for each object which may not vary over time. For instance, to determine an amount of the physical item that has been used may be made by subtracting the "current" weight from the "full" weight. In some embodiments, however, the "current" weight may be compared to a fixed threshold value set by the individual (e.g., a percentage of the original weight, less than a threshold weight, etc.). In some embodiments, profile 14 may alternatively, or additionally, be stored by inventory management system 270. Thus, in response to receiving the sensor data, backend system 100 may send the sensor data and a device identifier or user account associated with storage unit 10 to inventory management system 270.

At step 1106, backend system 100 may determine whether the weight of physical item 4 is below a predetermined threshold weight. The predetermined threshold weight may, in some embodiments, correspond to a weight at which a replacement for physical item 4 should be reordered. In some embodiments, the predetermined threshold weight may be based on the type of physical item 4. For example, ketchup may have a predetermined threshold weight, while milk may have a different predetermined threshold weight. In some embodiments, individual 2 may set the predetermined threshold weight for each physical item, or the threshold weight may be set by backend system 100 and/or inventory management system 270. If backend system 100 determines that the weight of physical item 4 is greater than, or equal to, the predetermined threshold weight, process 1100 proceed to step 1108, where process 100 may end.

However, if backend system 100 determines that the weight of physical item 4 is below the predetermined threshold weight, process 1100 may proceed to step 1110. At step 1110, backend system 100 may generate notification information. In some embodiments, the notification information may correspond to a notification that physical item 4 should be reordered. In some other embodiments, backend system 100 may automatically order a replacement for physical item 4, and the notification information may indicate that an order for physical item 4 has been sent to a supplier (e.g., inventory ordering module 272). In still other embodiments, inventory management system 270 may generate and send the order notification to inventory ordering module 272, however persons of ordinary skill in the art will recognize that this is merely exemplary.

At step 1112, backend system 100 may send the notification information to storage unit 10 and/or user device 102. In some embodiments, backend system 100 may send the notification information to storage unit 10, as well as audio data and/or display data, which may correspond to an audio or visual notification that physical item 4 should be, or has been, reordered. Storage unit 10 may output the notification through its speakers as audio or it may visually show the notification on a display. In some other embodiments, backend system 100 may send the notification information to a supplier of physical item 4 in order to automatically reorder physical item 4. Persons of ordinary skill in the art will further recognize that, in some embodiments, steps 1110 and 1112 may occur at a substantially same time, and the aforementioned is merely exemplary.

Figure 14:
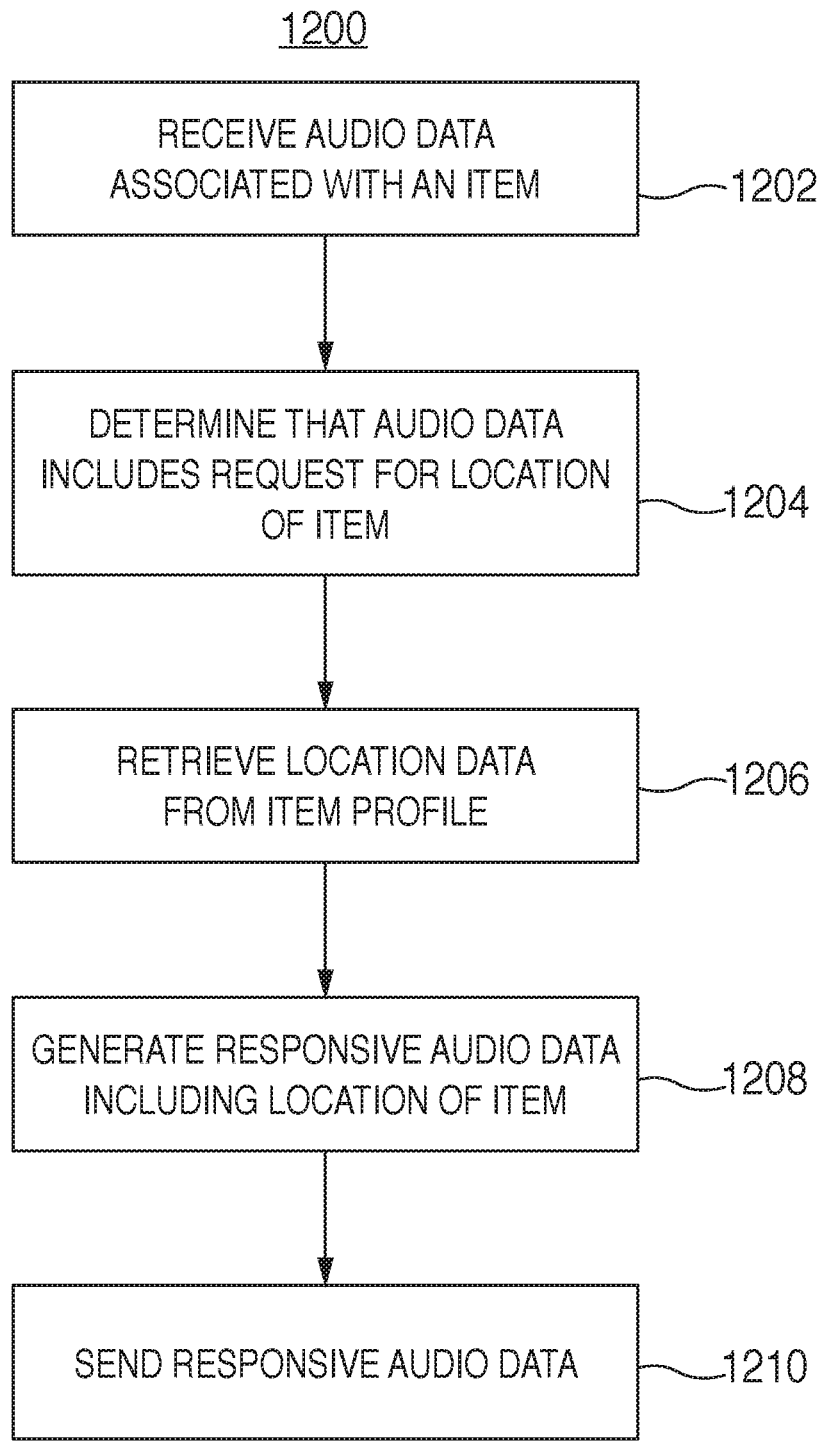
FIG. 14 is an illustrative flowchart of a process for providing a location of a physical item, in accordance with various embodiments.

FIG. 14 is an illustrative flowchart of a process for providing a location of a physical item, in accordance with various embodiments. Process 1200 may be implemented, for example, by backend system 100 and/or inventory management system 270. Process 1200, in some embodiments, may begin at step 1202. At step 1202, backend system 100 may receive audio data representing an utterance asking for a location of a physical item (e.g., "ketchup") from storage unit 10. At step 1204, backend system 100 may determine that the audio data includes the request for the location of physical item 4. For instance, backend system 100 may perform speech-to-text processing to generate text data representing the audio data, and may perform natural language understanding processing to determine that the text data includes the request for the location of physical item 4.

At step 1206, backend system 100 may retrieve location information associated with physical item 4 from profile 14 corresponding to physical item 4. For instance, backend system 100 may, additionally, receive a device identifier for storage unit 10, and using the device identifier, may determine a user account on backend system 100 that may be associated with storage unit 10. Using the user account, backend system 100 may determine a device profile, as well as a physical item profile, associated with storage unit 10, where the device and/or physical item profile may be stored by backend system 100 with the user account, as well as, or alternatively, being stored by inventory management system 270. Using the device profile and/or the physical item profile, a location within storage unit 10 (e.g., "top left shelf") of the requested physical item may be determined.

At step 1208, backend system 100 may generate responsive audio data representing the location of physical item 4. In some embodiments, backend system 100 may, itself, generate text data representing the location of the requested physical item, or backend system 100 may receive text data representing a message indicating the location of the requested physical item. Backend system 100 may then perform text-to-speech processing to generate responsive audio data representing the text data, to indicate the location of the requested physical item. At step 1210, backend system 100 may send the responsive audio data to storage unit 10 such that storage unit 10 may output the responsive audio data through its speakers (e.g., speaker(s) 210).

Figure 15:
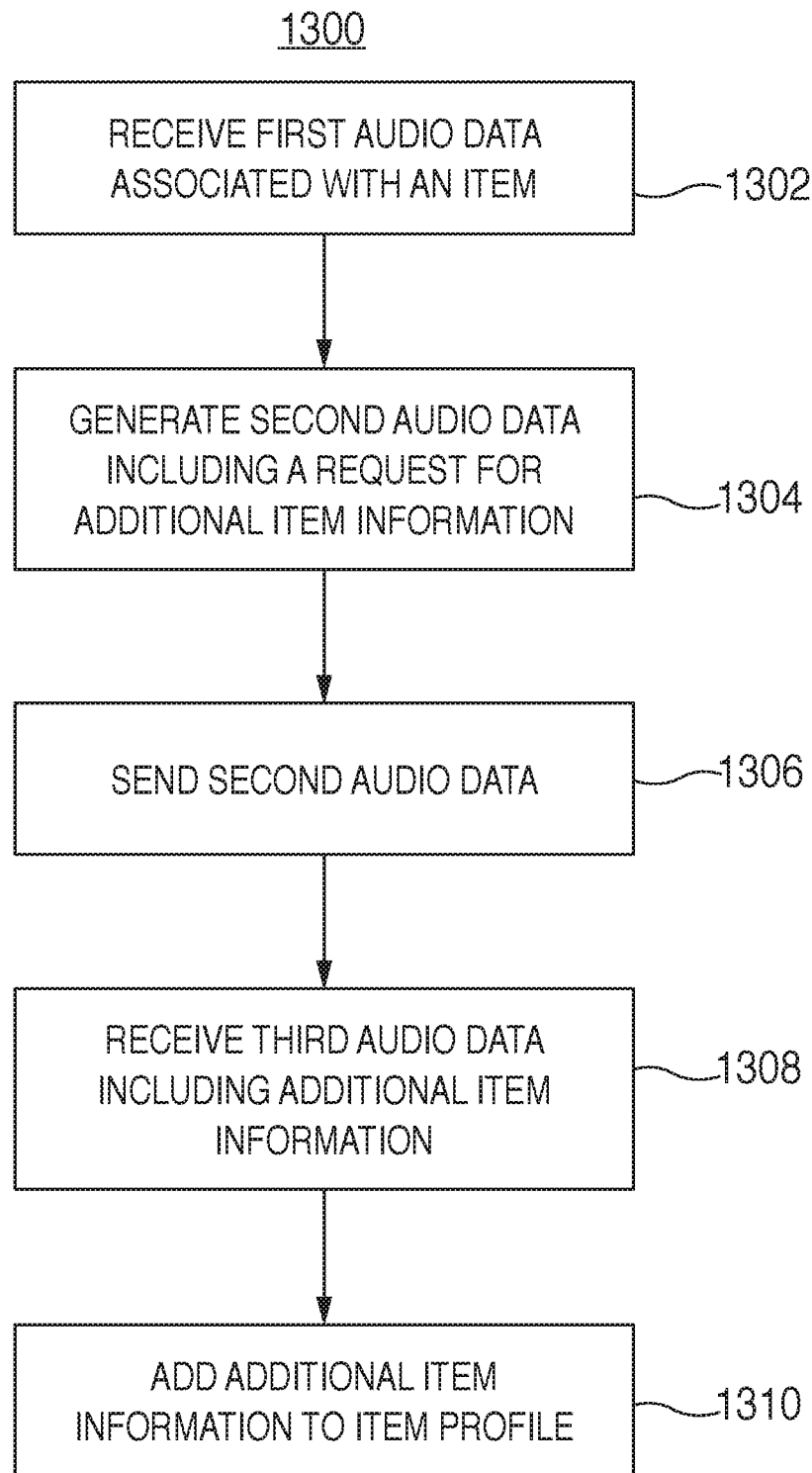
FIG. 15 is an illustrative flowchart of a process for gathering additional information about a physical item, in accordance with various embodiments.

FIG. 15 is an illustrative flowchart of a process for gathering additional information about a physical item, in accordance with various embodiments. Process 1300 may be implemented, for example, by backend system 100 and/or inventory management system 270. In some embodiments, process 1300 may begin at step 1302. At step 1302, backend system 100 may receive first audio data representing an utterance indicating a name associated with physical item 4 from storage unit 10. The utterance may include, for example, a user-provided name of physical item 4. For example, individual 2 may say, "This is ketchup." At step 1304, backend system 100 may generate text data representing a request for additional information about physical item 4, and may further generate audio data representing the text data. In some embodiments, backend system 100 may receive the text data from inventory management system 270 in response to receiving text data representing the first audio data from backend system 100. For example, in some embodiments, the second audio data may correspond to an audio message of a request for a brand of physical item 4. At step 1306, backend system 100 may send the second audio data to storage unit 10, such that storage unit 10 may output the second audio data through its speakers thereby allowing an individual in the vicinity of storage unit 10, such as individual 2, to hear the request for additional information.

At step 1308, backend system 100 may receive third audio data from storage unit 10. The third audio data may represent an additional utterance including the additional information about physical item 4 provided by individual 2. Backend system 100 may determine the additional information about physical item 4 from the third audio data by using, for example, speech-to-text and natural language understanding processing. At step 1310, backend system 100 may add the additional information about physical item 4 to profile 14 corresponding to physical item 4. For example, in response to receiving audio data representing the utterance, "The brand name is 'Brand 1'," backend system 100 may cause profile 14 for physical item 4 to be updated to indicate that the brand of physical item 4 is "Brand 1."

Figure 16:
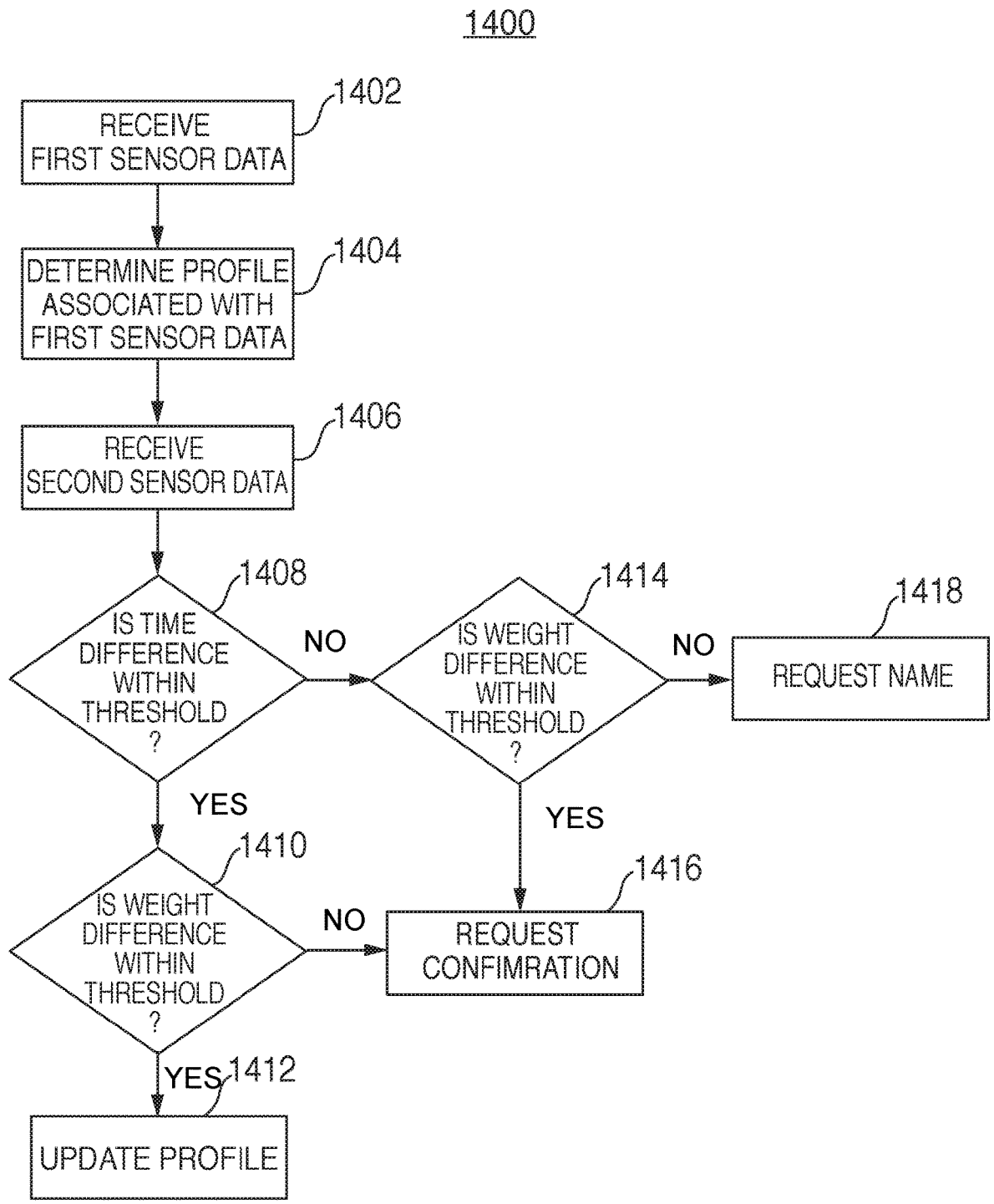
FIG. 16 is an illustrative flowchart of a process for identifying a physical item, in accordance with various embodiments.

FIG. 16 is an illustrative flowchart of a process for identifying a physical item, in accordance with various embodiments. Process 1400 may be implemented, for example, by backend system 100 and/or inventory management system 270. In some embodiments, process 1400 may begin at step 1402. At step 1402, backend system 100 may receive first sensor data from storage unit 10, where the first sensor data may indicate a first weight of a physical item residing on a first sensor, or sensors, as being no weight (e.g., zero). The first sensor data may also include a first timestamp indicating a first time at which the first sensor data was determined by the first sensor(s).

At step 1404, backend system 100 may determine that a physical item profile associated with the given location or sensor(s) and, from the profile, determine a particular physical item that is associated with that given location. In other words, backend system 100 may determine the identity of the physical item that was removed from storage unit 10 based, at least in part, on the location of the first sensor, and that no weight is currently being measured by the first sensor(s). Backend system 100 may also determine an initial, or most recent, weight of the physical item from the profile. At step 1406, backend system 100 may receive second sensor data indicating that a physical item was placed at a given location in storage unit 10. For example, in response to a door of storage unit 10 being opened, storage unit 10 may determine whether any sensors 214 of storage unit 10 detected a change in weight being applied to them, and based on the determined change, may be determine whether a physical item has been placed in storage unit 10. For instance, if a sensor measured no weight, and then after the door opened, measured a non-zero weight, then this may indicate that a physical item was placed in storage unit 10 at a location associated with that sensor. The second sensor data may indicate a second weight of the physical item at the given location and may also include a second timestamp indicating a second time at which the second sensor data was obtained.

At step 1408, backend system 100 may determine whether the difference between the first and second times (i.e., the difference in time between physical item 4 was removed from storage unit 10 and an as yet unidentified physical item was placed in storage unit 10) is within a predetermined threshold time. If backend system 100 determines that the difference between the first and second time is within the predetermined threshold times, it raises the confidence factor that backend system 100 can correctly identify the physical item that was placed in storage unit 10 and process 1400 proceeds to step 1410. At step 1410, backend system 100 may determine whether the difference between the first and second weights is within a threshold weight value. If backend system 100 determines that the difference between the first and second weights is within the predetermined threshold weight value, it further raises the confidence factor that backend system 100 can correctly identify the physical item that was placed in storage unit 10 and process 1400 proceeds to step 1412. In some embodiments, determinations of "YES" at steps 1408 and 1410 may raise the confidence factor high enough that backend system 100 may determine that the physical item placed in storage unit 10 is, in fact, physical item 4, which was recently removed from storage unit 10 without requesting a confirmation. Accordingly, process 1400 may proceed to step 1412 and backend system 100 may update profile 14 corresponding to physical item 4 by adding the new weight and location of physical item 4 to profile 14.

In some embodiments, when the difference between the first and second time is within the predetermined threshold time or the difference between the first and second weights is within the predetermined threshold weight, backend system 100 may request a confirmation of the name of the physical item that was placed in storage unit 10. For example, if backend system 100 determines that the difference between the first and second times is not within the predetermined threshold time at step 1408 and then determines that the difference between the first and second weights is within the predetermined threshold weight at step 1414, process 1400 may proceed to step 1416. Similarly, if backend system 100 determines that the difference between the first and second times is within the predetermined threshold time at step 1408 and the determines that the difference between the first and second weights is not within the predetermined threshold weight, process 1400 may proceed to step 1416. At step 1416, backend system 100 may request a confirmation of the name of the physical item placed in storage unit 10 by generating audio data representing the request for confirmation and sending it to storage unit 10. In some embodiments, backend system 100 may incorporate the name of physical item 4 into the request (e.g., "Did you place ketchup in the refrigerator?"). Also, in some embodiments, if backend system 100 receives a negative response to the request for confirmation of the name of the physical item, backend system 100 may subsequently generate a request for the name of the physical item (e.g., "What item did you place in the refrigerator?").

In the case that backend system 100 determines that the difference between the first and second times is not within the predetermined threshold time at step 1408 and that the difference between the first and second weights is not within the predetermined threshold weight at step 1414, process 1400 may proceed to step 1418. In some embodiments, negative determinations at steps 1408 and 1418 lower the confidence factor that backend system 100 can correctly identify the physical item placed in storage unit 10 enough that it is very unlikely that backend system 100 can even postulate a name of the physical item placed in storage unit 10. In this case, rather than requesting a confirmation of the name of the physical item placed in storage unit 10, backend system 100 may generate a request for the name of the physical item placed in storage unit 10 (e.g., "What item did you just place in the refrigerator?") at step 1418.

The various embodiments of the invention may be implemented by software, but may also be implemented in hardware, or in a combination of hardware and software. The invention may also be embodied as computer readable code on a computer readable medium. The computer readable medium may be any data storage device which may thereafter be read by a computer system.

The above-described embodiments of the invention are presented for purposes of illustration and are not intended to be limiting. Although the subject matter has been described in language specific to structural feature, it is also understood that the subject matter defined in the appended claims is not necessarily limited to the specific features described. Rather, the specific features are disclosed as illustrative forms of implementing the claims.

What is claimed is:

1. A method for tracking inventory in a refrigerator, the method comprising:
    receiving, at an electronic device, first audio data representing a first utterance asking where a first physical item is located within the refrigerator in response to a door of the refrigerator being opened;
    receiving, from the refrigerator, a device identifier associated with the refrigerator;
    generating first text data representing the first audio data by performing automated speech recognition processing on the first audio data;
    determining, using natural language understanding processing, that the first text data corresponds to a request for identification of a current location of the first physical item;
    determining a user account that is associated with the device identifier;
    determining a refrigerator profile on an inventory management system that is associated with user account, the refrigerator profile including location information, physical item information, and weight information associated with physical items stored within the refrigerator;
    determining supplemental data corresponding to a change in a weight measurement of the first physical item;
    analyzing the supplemental data to determine the change is associated with a range of weights of the first physical item;
    associating the supplemental data with the physical items stored within the refrigerator;
    sending, to the inventory management system, a first request for data identifying the current location of the first physical item within the refrigerator, wherein sending the request comprises sending the device identifier to the inventory management system such that the refrigerator profile is accessed;
    determining, based on association between the user account, the refrigerator profile, and the supplemental data, the current location of the first physical item is at a first location;
    receiving, from the inventory management system, second text data indicating the first location of the first physical item within the refrigerator;
    generating second audio data by performing text-to-speech processing on the second text data; and
    sending the second audio data to the refrigerator to cause a response message to be output by a speaker of the refrigerator.

2. The method of claim 1, further comprising:
receiving, from the refrigerator, first weight sensor data representing a first weight determined by a first weight sensor of the refrigerator;
receiving third audio data representing a second utterance that indicates that the first physical item was placed within the refrigerator at a second location;
generating third text data representing the third audio data by performing the automated speech recognition processing on the third audio data;
determining, using the natural language understanding processing, that the third text data indicates that the first physical item was placed at the second location; and
sending, to the inventory management system, the third text data and the first weight sensor data such that the inventory management system is able to update the refrigerator profile to have the first physical item be associated with the second location be associated, and update a current weight of the first physical item to be the first weight.

3. The method of claim 1, further comprising:
receiving, from the refrigerator, third audio data representing a second utterance requesting a current location of a second physical item while the door is still open;
generating third text data representing the third audio data by performing the automated speech recognition processing on the third audio data;
determining, using the natural language understanding processing, that the third text data corresponds to a request for the current location of the second physical item, the second physical item having a second physical item name;
sending, to the inventory management system, a second request for the current location of the second physical item associated with the second physical item name;
receiving, from the inventory management system, fourth text data representing an additional response message indicating that, for the refrigerator profile, the second physical item is currently located at a second location within the refrigerator;
generating fourth audio data representing the fourth text data by performing the text-to-speech processing on the third text data; and
sending the fourth audio data to the refrigerator such that the additional response message is played by the speaker to indicate that the second physical item is located at the second location.

4. The method of claim 1, further comprising:
receiving, prior to receiving the first audio data, a notification that the door has been opened based on the refrigerator determining that a door sensor of the refrigerator output a signal indicating that the door was opened; and
causing, in response to the notification, the first audio data to be received from the refrigerator such that audio signals of the first utterance are received by a microphone of the refrigerator, the refrigerator generates the first audio data representing the first utterance using the audio signals received by the microphone, and the refrigerator sends the first audio data to the electronic device for automated speech recognition processing.

5. A method, comprising:
receiving sensor data representing a weight of a physical item from a sensor of a first device, wherein the sensor is at a first location;
determining that the physical item has a range of associated weights;
determining the sensor data corresponds to a change in weight of the physical item;
associating, based at least in part on the change in weight, the sensor data with the physical item;
receiving a device identifier corresponding to the first device;
determining a user profile associated with the device identifier;
determining, based at least in part on the sensor data and the user profile, the physical item;
storing an association between the sensor and the physical item;
receiving, from the first device, first audio data representing a first utterance;
performing speech processing on the first audio data to determine that the first utterance requests information identifying a current location of the physical item;
identifying stored data corresponding to the association;
determining, using the stored data, that the current location of the physical item is at the first location;
receiving data representing the first location;
generating second audio data representing the data; and
sending the second audio data to the first device to cause the first device to output audio corresponding to the second audio data.

6. The method of claim 5, further comprising:
determining that the sensor data corresponds to the weight corresponding to the first location; and
determining that the physical item has the weight.

7. The method of claim 6, further comprising:
receiving, from the first device, third audio data representing a second utterance;
determining that the second utterance indicates additional information associated with the physical item; and
sending, to an inventory management system, a request to update the user profile to indicate that the additional information is associated with the first location, such that the user profile includes the additional information and the weight as being associated with the physical item.

8. The method of claim 5, further comprising:
receiving, from the first device, third audio data representing a second utterance;
determining that the second utterance indicates a second location where the physical item is stored; and
causing the user profile to store an additional association between the physical item and the second location.

9. The method of claim 5, further comprising:
receiving second data representing a second request for additional information associated with the physical item;
generating third audio data representing the second data;
sending the third audio data to the first device; and
sending an instruction to the first device that causes the first device to send fourth audio data representing second audio captured after the second request is output.

10. The method of claim 9, further comprising:
receiving, from the first device, the fourth audio data representing a second utterance;
determining, using the fourth audio data, that the second utterance indicates the additional information; and
sending, to an inventory management system, a request to update causing the user profile to store an additional association between the additional information and the physical item.

11. A system, comprising:
communication circuitry;
at least one processor;
at least one memory including instructions operable to be executed by the at least one processor to configure the system to:
 receive sensor data representing a weight of a physical item from a sensor of a first device, wherein the sensor is at a first location;
 determine the physical item has a range of associated weights;
 determine the sensor data corresponds to a change in weight of the physical item;
 associate, based at least in part on the change in weight, the sensor data with the physical item;
 receive a device identifier from the first device;
 determine a user profile associated with the device identifier;
 determine, based at least in part on the sensor data and the user profile, a physical item;
 store an association between the sensor and the physical item;
 determine that first audio data representing a first utterance was received from the first device;
 perform speech processing on the first audio data to determine that the first utterance requests information identifying a current location of the physical item;
 identify stored data corresponding to the association;
 determine, using the stored data, that current location of the physical item is at the first location;
 receive data representing the first location;
 generate second audio data representing the data; and
 send the second audio data to the first device to cause the first device to output audio corresponding to the second audio data.

12. The system of claim 11, wherein the at least one memory further comprises instructions that, when executed by the at least one processor, further configure the system to:
 determine that sensor data corresponds to the weight corresponding to the first location; and
 determine that the physical item has the weight.

13. The system of claim 12, wherein the at least one memory further comprises instructions that, when executed by the at least one processor, further configure the system to:
 determine that third audio data representing a second utterance was received from the first device;
 determine that the second utterance indicates additional information associated with the physical item; and
 send, to an inventory management system, a request to update the user profile to indicate that the additional information is associated with the first location, such that the user profile includes the additional information and the weight as being associated with the physical item.

14. The system of claim 11, wherein the at least one memory further comprises instructions that, when executed by the at least one processor, further configure the system to:
 determine that third audio data representing a second utterance was received from the first device;
 determine that the second utterance indicates a second location where the physical item is stored; and
 causing the user profile to store an additional association between the physical item and the second location.

15. The system of claim 11, wherein the at least one memory further comprises instructions that, when executed by the at least one processor, further configure the system to:
 receive second data representing a second request for additional information associated with the physical item;
 generate third audio data representing the second data;
 send the third audio data to the first device; and
 send an instruction to the first device that causes the first device to send fourth audio data representing audio captured after the second request is output.

16. The system of claim 15, wherein the at least one memory further comprises instructions that, when executed by the at least one processor, further configure the system to:
 determine that the fourth audio data representing a second utterance was received from the first device;
 determine, using the fourth audio data, that the second utterance indicates the additional information; and
 send, to an inventory management system, a request to update causing the user profile to store an additional association between the additional information and the physical item.

* * * * *